United States Patent
Shiroshima

(10) Patent No.: US 8,537,988 B2
(45) Date of Patent: Sep. 17, 2013

(54) MESSAGE RELAY SYSTEM WITH MESSAGE RELAY SERVER

(75) Inventor: Takahiro Shiroshima, Minato-ku (JP)

(73) Assignee: NEC Corporation, Tokyo (JP)

( * ) Notice: Subject to any disclaimer, the term of this patent is extended or adjusted under 35 U.S.C. 154(b) by 629 days.

(21) Appl. No.: 12/744,304

(22) PCT Filed: Nov. 18, 2008

(86) PCT No.: PCT/JP2008/070959
§ 371 (c)(1),
(2), (4) Date: Jul. 7, 2010

(87) PCT Pub. No.: WO2009/066671
PCT Pub. Date: May 28, 2009

(65) Prior Publication Data
US 2010/0266108 A1  Oct. 21, 2010

(30) Foreign Application Priority Data
Nov. 22, 2007 (JP) .................... 2007-302525

(51) Int. Cl.
*H04M 11/00* (2006.01)
(52) U.S. Cl.
USPC ................. 379/93.09; 379/93.14
(58) Field of Classification Search
USPC ............ 379/93.17, 93.09, 93.14, 93.23
See application file for complete search history.

(56) References Cited

U.S. PATENT DOCUMENTS

| 5,742,670 | A | * | 4/1998 | Bennett ................... 379/142.04 |
| 6,134,235 | A | * | 10/2000 | Goldman et al. ............ 370/352 |
| 6,438,599 | B1 | * | 8/2002 | Chack .......................... 709/229 |
| 6,704,294 | B1 | * | 3/2004 | Cruickshank ................ 370/265 |
| 6,741,586 | B1 | * | 5/2004 | Schuster et al. ............. 370/352 |
| 7,099,288 | B1 | * | 8/2006 | Parker et al. ................. 370/259 |
| 7,899,164 | B2 | * | 3/2011 | Sylvain et al. ............ 379/93.23 |
| 2005/0165719 | A1 | | 7/2005 | Greenspan et al. |
| 2007/0136432 | A1 | | 6/2007 | Murakami et al. |

FOREIGN PATENT DOCUMENTS

| JP | 2004-254142 A | 9/2004 |
| JP | 2005-012380 A | 1/2005 |
| JP | 2005-252668 A | 9/2005 |
| JP | 2007-166018 A | 6/2007 |

OTHER PUBLICATIONS

European Search Report dated Oct. 11, 2012 issued by the European Patent Office in counterpart European Application No. 08852438.4.

* cited by examiner

*Primary Examiner* — Olisa Anwah
(74) *Attorney, Agent, or Firm* — Sughrue Mion, PLLC

(57) ABSTRACT

A message relay server includes a call state control section that acquires call state data containing data identifying telephones from a line switching server which controls speech communication calls; a call state storage section storing the call state data for each of the calls; a message relay section receiving a message, which includes the identification data of a first telephone, from a first client terminal, and specifying a second telephone; and a message storage section configured to store the message and identification data of the second telephone. The message relay section receives a message inquiry, to acquire a message which includes the identification data of the second telephone, from a second client terminal, and transmits the stored message for the identifier data.

20 Claims, 19 Drawing Sheets

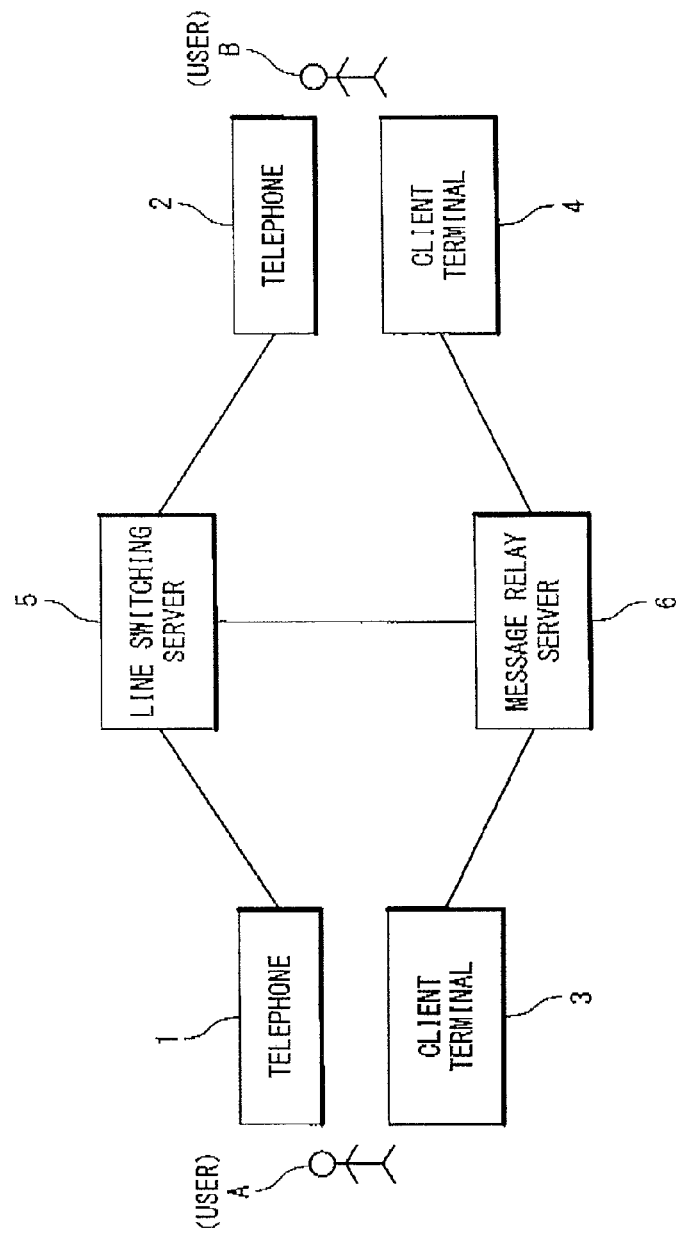

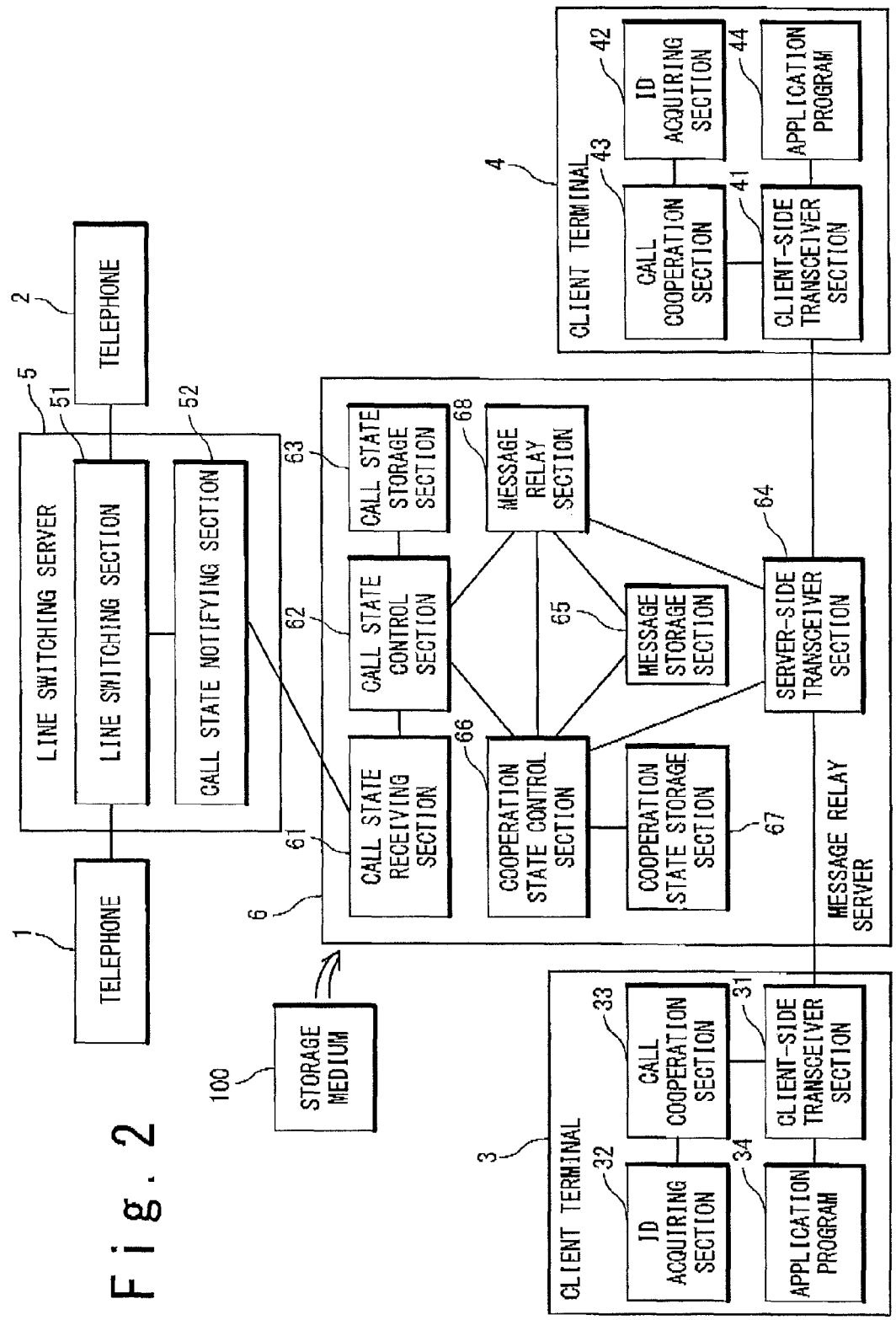

Fig. 3A

| CALL STATE | TELEPHONE NO. 1 | TELEPHONE NO. 2 |
|---|---|---|
| BUSY | 1001 | 1002 |

Fig. 3B

| CALL STATE | TELEPHONE NO. 1 | TELEPHONE NO. 2 |
|---|---|---|
| BUSY | 1003 | 1002 |

Fig. 3C

| CALL STATE | TELEPHONE NO. 1 | TELEPHONE NO. 2 |
|---|---|---|
| HELD | 1001 | 1003 |

Fig. 3D

| CALL STATE | TELEPHONE NO. 1 | TELEPHONE NO. 2 |
|---|---|---|
| BUSY | 1001 | 1003 |

Fig. 4

| ID | TELEPHONE NO. |
|---|---|
| abc | 1001 |
| def | 1002 |

Fig. 5A

| MESSAGE | DESTINATION | SOURCE | RECEPTION STATE |
|---|---|---|---|
|  |  |  |  |
|  |  |  |  |

Fig. 5B

| MESSAGE | DESTINATION | SOURCE | RECEPTION STATE |
|---|---|---|---|
| "Hello" | 1002 |  |  |
| "Hi" |  | 1003 | YET |

Fig. 6A

| MESSAGE | DESTINATION | SOURCE | RECEPTION STATE |
|---|---|---|---|
| "Hello" | 1002 | | |

Fig. 6B

| MESSAGE | DESTINATION | SOURCE | RECEPTION STATE |
|---|---|---|---|
| "Hello" | | 1001 | YET |

Fig. 6C

| MESSAGE | DESTINATION | SOURCE | RECEPTION STATE |
|---|---|---|---|
| "Hello" | | 1001 | DONE |

Fig. 7

| MESSAGE | DESTINATION | SOURCE | RECEPTION STATE |
|---------|-------------|--------|-----------------|
| "Hello" | 1002 | | TRANSFER |
| "Hi" | | 1003 | TRANSFER | ns
MESSAGE RELAY SYSTEM WITH MESSAGE RELAY SERVER

CROSS REFERENCE TO RELATED APPLICATIONS

This application is a National Stage of International Application No. PCT/JP2008/070959 filed Nov. 18, 2008, claiming priority based on Japanese Patent Application No. 2007-302525, filed Nov. 22, 2007, the contents of all of which are incorporated herein by reference in their entirety.

TECHNICAL FIELD

The present invention relates to a message relay system, and more particularly relates to a message relay system with a message relay server which carries out message relay between information processing terminals in cooperation to a call state of speech communication terminals.

BACKGROUND ART

A remote cooperation system is a system that enables users, who are separately located at remote locations, to perform a cooperation work through a network. The remote cooperation system enables the users, who are separately located at the remote locations, to refer to same documents at a same time, carry out edition, and exchange a file each other. Also, the remote cooperation system enables the users to refer to a same Web page and operate the same Web page.

In such a remote cooperation system, a terminal used by the user is configured in such a manner that a speech communication system and a data operation system can be operated on the terminal. The speech communication system is a system for providing a speech communication. The data operation system is a System that enables data such as documents, drawings and Web pages to be operated in synchronization with the speech communication. In this way, the remote cooperation system provides a mechanism, which enables the speech communication and the data operation to be carried out at the same time, to the user.

However, typically, telephones have been used for the speech communication system from old time. For this reason, the user demands that the speech communication can be performed through the telephones as in a conventional technique, from the viewpoints of stability and simplicity. On the other hand, in recent years, the realization of IP (Internet Protocol) telephones makes cooperation between an IP telephone system and various computer systems easy. In association with this, a system in which the IP telephone system and the remote cooperation system are cooperated is proposed, as described below.

Japanese Patent Publication (JP 2007-166018A) discloses a file sharing system in which a file can be shared between users who perform speech communication without any use of a terminal with a special function. The file sharing system is the file sharing system that is connected to a call control apparatus for controlling a call between a plurality of call terminals. The file sharing system contains; a call state monitoring section that detects the call between the call terminals from the call control apparatus, and acquires a data to specify both of the users who are performing the speech communication for each call, and then records as a call state data in a recording section; a share space generating section that generates a file share space to be shared between the users, who are specified by the call state data, on a recording medium that can be accessed from a plurality of data communication terminals, and relates a data to identify the generated file share space and data to specify the users, to record as a relation data in the recording section; and an access control section that permit the accesses from the data communication terminals by the users for the file share space indicated by the relation data, among the accesses from the data communication terminals for the file share space.

Also, Japanese Patent Publication (JP 2005-012380A) discloses a multimedia data transfer system in which the efficiency of a work is improved and transmission/reception of a data can be performed independently of a place. The multimedia data transfer system is the multimedia transfer system that accommodates an extension line terminal inside a self-apparatus and includes a call connection control apparatus to which an information terminal is connected on which a software runs to integrate multimedia data such as voice data, video data, text data. In the multimedia data transfer system, a database that stores a cooperation data, when a cooperation is performed between the internal line terminal and the software; and a determining section for determining the presence or absence of the information terminal after the completion of the cooperation and the state of the software from the storage content of the database are contain in the call connection control apparatus. In the multimedia transfer system, during the speech communication call between the extension line terminal and a different extension line terminal, when the determining sections of the extension line terminal and the different extension line terminal detect that there is the information terminal after the completion of the cooperation and that in the information terminal, the software is in a start state and that the software is not used, the transfer of the multimedia data is started between the software of the respective information terminals.

However, in the file sharing system of Japanese Patent Publication (JP 2007-166018A), although the file can be shared between the users who are in the speech communication to each other, the message transmission/reception cannot be performed. Also, in the multimedia data transfer system of Japanese Patent Publication (JP 2005-012380A), by using the obtained IP address, the message can be transmitted and received between multimedia applications on opposite PCs. However, the message cannot be transmitted and received in the speech communication state between the extension line telephones. Thus, when the transfer of the speech communication call is requested, the user must again start the PC that is to be cooperated with the extension line telephone of a transfer destination and again register the IP address in PBX. Thus, there was a subject that the convenience of the user cannot be improved.

DISCLOSURE OF THE INVENTION

An object of the present invention is to provide a message relay system in which a message can be easily transmitted and received in cooperation to a speech communication connection state of speech communication terminals.

The message relay server that is one implementation of the present invention contains: a call state control section that acquires a call state data including identification data of telephones in a speech communication state, from a line switching server which carries out a call control for the speech communication; a call state storage section for storing the call state data for each call for the speech communication; a message relay section that receives a message, which includes the identification data of a first telephone of the telephones, from one client terminal among a plurality of client terminals in coordination with the first telephone, and specifies a second telephone, which performs the speech communication with the first telephone, in accordance with the identification data and call state data of the first telephone included in the message; and a message storage section for storing the message and the identification data of the second telephone which are related to each other. The message relay section receives a message inquiry to acquire the message, which includes the identification data of the second telephone, from a second client terminal among the plurality of client terminals in cooperation with the second telephone, and transmits the message, which is stored for the identification data of the second telephone included in the message inquiry, to the second client terminal.

Also, a message relay system that is one implementation of the present invention contains; a plurality of client terminals that transmit and receive messages; a line switching server for performing a call connection control of speech communication between a plurality of telephones; and a message relay server. The message relay server contains: a call state control section for acquiring a call state data, which includes a identification data of telephones in the speech communication call among the plurality of telephones, from the line switching server; a call state storage section for storing the call state data for each call of speech communication; a message relay section that receives a message, which includes the identification data of a first telephone among the plurality of telephones, from a first client terminal among the plurality of client terminals in cooperation with the first telephone, and specifies a second telephone in the speech communication with the first telephone in accordance with the identification data and the call state data of the first telephone included in the message; and a message storage section for storing the message and the identification data of the second telephone which are related to each other. The message relay section receives a message inquiry to acquire a message, which includes the identification data of the second telephone, from the second client terminal among the plurality of client terminals in cooperation with the second telephone, and transmits the message, which has been stored for the identification data of the second telephone included in the message inquiry, to the second client terminal.

Also, a message relay method that is one implementation of the present invention is achieved by carrying out a call connection control of speech communication between a plurality of telephones; by acquiring a call state data that includes identification data of the telephones in the speech communication among a plurality of telephones; by storing the call state data for each call of the speech communication; by receiving a message that includes the identification data of a first telephone among the plurality of telephones and specifying a second telephone in the speech communication with the first telephone in accordance with an identification data and call state data of the first telephone included in the message; by storing the message and the identification data of the second telephone which are related to each other; and by receiving a message inquiry to acquire the message which includes the identification data of the second telephone, and transmitting the message that has been stored for the identification data of the second telephone included in the message inquiry.

A storage medium that is one implementation of the present invention stores a program for instructing a computer to execute; a step of obtaining a call state data that includes identification data of telephones in a speech communication among the plurality of telephones; a step of storing the call state data for each call of the speech communication; a step of receiving a message that includes the identification data of the first telephone among the plurality of telephones; a step of specifying the different telephone in the speech communication with the first telephone in accordance with the identification data and the call state data of the first telephone included in the message; a step of storing the message and the identification data of a second telephone which are related to each other; a step of receiving an inquiring message to acquire the message including the identification data of the second telephone; and a step of transmitting the message having been stored for the identification of the second telephone included in the inquire message.

According to the present invention, it is possible to provide the message relay system that enables the message transmission/reception to be easily performed in cooperation to a speech communication connection state of speech communication terminals.

BRIEF DESCRIPTION OF DRAWINGS

The above-mentioned objects, effects and features of the present invention will be further understood from the descriptions of embodiments in cooperation with the attached drawings:

FIG. 1 is a block diagram showing the entire configuration of a message relay system;

FIG. 2 is a block diagram showing the entire configuration of the message relay system;

FIG. 3A is a diagram showing one example of a call state data;

FIG. 3B is a diagram showing one example of the call state data;

FIG. 3C is a diagram showing one example of the call state data;

FIG. 3D is a diagram showing one example of the call state data;

Figure 4:
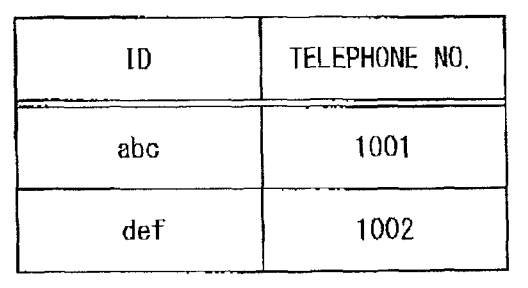

FIG. 4 is a diagram showing one example of a cooperation data;

FIG. 5A is a diagram showing one example of a message storage table;

FIG. 5B is a diagram showing one example of the message storage table;

FIG. 6A is a diagram showing one example of the message storage table;

FIG. 6B is a diagram showing one example of the message storage table;

FIG. 6C is a diagram showing one example of the message storage table;

FIG. 7 is a diagram showing one example of the message storage table;

BEST MODE FOR CARRYING OUT THE INVENTION

Figure 8:
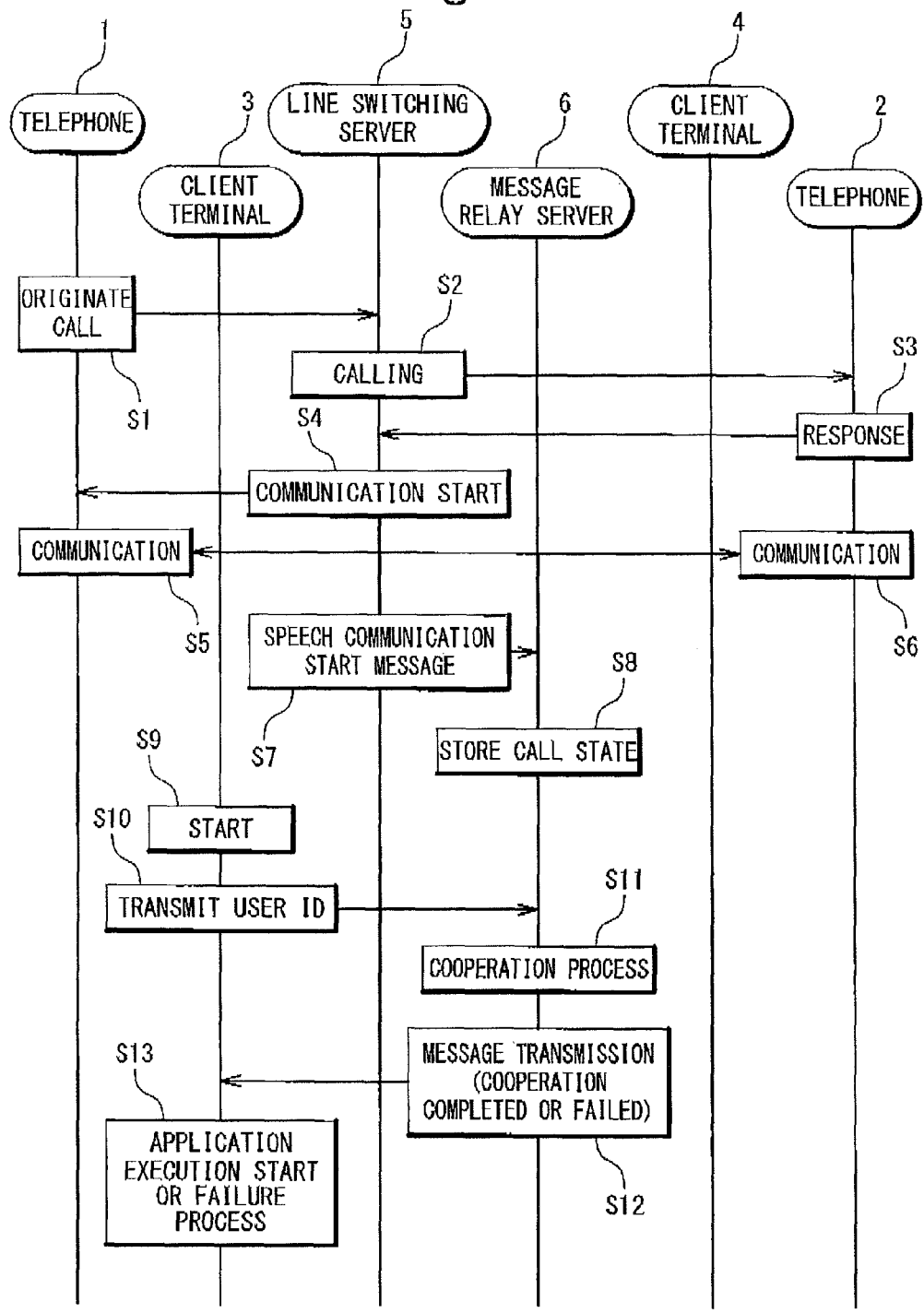
FIG. 8 is a sequence diagram showing an operation of the message relay system.

Hereinafter, a message relay system according to the present invention will be described below with reference to the attached drawings.

The message relay system according to an embodiment of the present invention will be described with reference to FIG. 1 to FIG. 19. FIGS. 1 and 2 are block diagrams showing the entire configuration of the message relay system. FIG. 3A to FIG. 3D are diagrams showing call state data. FIG. 4 is a diagram showing a cooperation data. FIG. 5A to FIG. 7 are diagrams showing message storage tables. FIG. 8 to FIG. 19 are diagrams showing the operations of the message relay system.

[Configuration]

At first, the configuration of the data relay system in this embodiment will be described. The message relay system in this embodiment contains a telephone 1, a telephone 2, a line switching server 4, a client terminal 3, a client terminal 4 and a message relay server 6, as shown in FIG. 1. The telephone 1 and the telephone 2 can make speech communication. The telephone 1 is operated by a user A who is a user of the telephone 1. The telephone 2 is operated by a user B who is a user of the telephone 2. The line switching server 4 carries out connection control of the speech communication between the telephone 1 and the telephone 2. The client terminal 3 and the client terminal 4 provide functions such as a file exchange, a chat, a shared white board and document browsing. The respective functions of the client terminal 3 or the client terminal 4 are attained by software programs of the client terminal 3 or the client terminal 4. The client terminal 3 is operated by the user A, similarly to the telephone 1. Also, the client terminal 4 is operated by the user B, similarly to the telephone 2. The message relay server 6 relays the message that is transmitted/received between the client terminal 3 and the client terminal 4. The configurations of the respective sections will be described below in detail.

The telephone 1 is a terminal that can make speech communication. The telephone 1 is operated by the user A. Also, the user A operates the client terminal 3. Similarly, the telephone 2 is a terminal that can make speech communication. The telephone 2 is operated by the user B. Also, the user B operates the client terminal 4. The client terminal 3 and the client terminal 4 are the information processing terminals. It should be noted that although not shown in FIG. 1, a telephone 7 is a terminal that can make speech communication. The telephone 7 is operated by a user C. Also, the user C operates a client terminal 8 (not shown). The telephone 7 is similar to the telephone 1 and the telephone 2. Also, the client terminal 8 is similar to the client terminal 3 and the client terminal 4. Here, the number of telephones and the number of client terminals are not limited to those numbers. There is a case that the larger number of telephones and client terminals exist.

The line switching server 5 contains a line switching section 51 and a call state notifying Section 52, as shown in FIG. 2. The line switching section 51 is a call control apparatus for controlling connection for speech communication between the telephone 1 and the telephone 2. The call state notifying section 52 acquires the call state of the speech communication connection processed by the line switching section 51. The call state indicates any of a start state, a busy state, a transfer state, a reservation state and an end state in the speech communication between the telephone 1 and the telephone 2. The call state notifying section 52 notifies a call state to the message relay server 6. It should be noted that the line switching section 51 and the call state notifying section 52 are accomplished by loading a program into an electronic circuit or operating apparatus.

The client terminal 3 contains a client-side transceiver (transmitter/receiver) section 31, an ID acquiring section 32, a call cooperation section 33 and an application program 34, as shown in FIG. 2. The client-side transceiver section 31 transmits/receives a message to/from the message relay server 6. The ID acquiring section 32 acquires an ID of the user A using the client terminal 3, or a telephone number of the telephone 1 in cooperation with the client terminal 3. The call cooperation section 33 transmits the ID or telephone number obtained by the ID acquiring section 32 to the message relay server 6 through the client-side transceiver section 31. When transmitting the ID or telephone number to the message relay server 6, the call cooperation section 33 requests the coordination between the client terminal 3 and the telephone 1 to the message relay server 6. The application program 34 provides to the user, the functions such as file exchange, chat, shared white board and the document browsing through the message relay server 6 or different server. It should be noted that the configuration of the respective sections in the client terminal 3 is accomplished by programs loaded or installed in the client terminal 3. Also, the client terminal 4 has the configuration similar to the client terminal 3. That is, the client terminal 4 has a client-side transceiver section 41, an ID acquiring section 42, a call cooperation section 43 and an application program 44, as shown in FIG. 2. Since the configuration of the respective sections in the client terminal 4 is similar to the configuration of the client terminal 3, the description is omitted. It should be noted that although the description is omitted, the client terminal 8 also contains the configuration similar to the client terminal 3.

The message relay server 6 contains a call state receiving section 61, a call state control section 62, a call state storage section 63, a server side transceiver section 64, a message storage section 65, a coordination state control section 66, a cooperation state storage section 67 and a message relay section 68, as shown in FIG. 2. The call state receiving section 61 receives a call state data from the line switching server 5. The message relay server 6 is a relaying apparatus of messages that are transmitted and received between the client terminals. The call state control section 62 stores a data of the call state received by the call state receiving section 61 in the call state storage section 63. The call state storage section 63 stores the call state data in a relation to the telephone number. The message relay section 68 transmits and receives the message to and from the client terminals 3 and 4. The message storage section 65 stores the messages received from the client terminals 3 and 4. The cooperation state control section 66 controls a cooperation state between the client terminal 3 or 4 and the telephone 1 or 2. The cooperation state storage section 67 stores the cooperation state between the client terminal 3 or 4 and the telephone 1 or 2. The message relay section 68 receives the message from the telephones 1 or 2 through the server-side transceiver section 68. The message relay section 68 inquires a telephone number for the transmission destination of a message to the call state control section 62. The call state control section 62 determines the telephone number of the transmission destination of the message based on the call state data stored for each telephone number in the call state storage section 63. The cooperation state control section 66 receives a data (call terminal specification data) to specify the telephones 1 and 2 from the client terminals 3 and 4 through the server-side transceiver section 64. The cooperation state control section 66 relates the client terminals 3 and 4 and the telephones 1 and 2. The message relay section 68 transmits and receives the message to and from the client terminals 3 and 4 in accordance with the call state data and the cooperation state. It should be noted that the detailed functions of the respective sections in the message relay server 6 will be described when the operating method will be later described. Also, the message relay server 6 is accomplished by loading or installing a predetermined processing program for attaining the functions of the message relay server 6. The processing program can be stored in a storage medium 100 as shown in FIG. 2. The storage medium 100 is, for example, CD (Compact Disc). The processing program is stored in the storage medium 100 so as to allow it to be carried. In that case, by loading the processing program from the storage medium into a computer, it is possible to accomplish the functions of the message relay server 6.

Here, FIGS. 3A to 3D show one example of the call state data stored in the call state storage section 62. Also, FIG. 4 shows one example of the cooperation state data stored in the cooperation state storage section 67. Moreover, FIGS. 5A, 53, 6A to 6C and FIG. 7 show one example of the message stored in the message storage section 65.

It should be noted that in FIGS. 1 and 2, the two telephones 1 and 2 are connected to the line switching server 5, and the client terminals 3 and 4 corresponding to the respective telephones are connected to the message relay server 6. However, the numbers of the telephones and the client terminals are not limited to them. With regard to the telephones and the client terminals, the larger numbers of them may be connected. Also, the telephones 1 and 2 may be fixed-line phones or mobile phones. When the telephones 1 and 2 can be connected to the line switching server 5 and make speech communication with a different telephone, whether they are fixed or mobile are not limited. Also, the client-side message transceivers 31 and 41, the ID acquiring sections 32 and 42, the call cooperation sections 33 and 43 and the application programs 34 and 44 may be installed as one application in each client terminal. Or, the client-side message transceivers 31 and 41, the ID acquiring sections 32 and 42, the call cooperation sections 33 and 43 and the application programs 34 and 44 may be installed as independent applications in the respective client terminals, and may be cooperated with each other by using a typical inter-process communication technique. Moreover, the telephone and the client terminal may be provided on one terminal, and the respective functions may be implemented on the same program. It should be noted that this embodiment exemplifies a case in which the data transmitted and received between the client terminals 3 and 4 is a message. However, the client terminals 3 and 4 can transmit and receive the data of various kinds, and it is not limited to only the transmission/reception of the message.

[Operating Method]

The operating method of the message relay system in this embodiment will be described below.

(Start of Speech Communication)

At first, the operation when the speech communication is started between the telephones 1 and 2 will be described with reference to FIG. 8. FIG. 8 shows the operation from the start of the communication between the telephones 1 and 2 to the start of cooperation between the telephone 1 and the client terminal 3. At first, the user A uses the telephone 1 and originates a call to a different user B in accordance with a conventional call originating method (Step S1). This method is typically performed such that the user A uses numeral buttons of the telephone 1 to input the telephone number of the user B. However, the dialing method is not limited to this. When a software program is used on the terminal, the dialing may be carried out by pushing the buttons displayed on a screen.

A line switching section 51 21 in the line switching server 5 receives a call from the telephone 1. The line switching section 51 21 calls the telephone 2 with a telephone number specified by the originated call (Step S2). The user B who is a counter end of the speech communication performs a predetermined operation on the telephone 2 and responds to the call (Step 63). The line switching section 51 21 starts a speech communication between the telephone 1 and the telephone 2 (Steps S4, S5 and S6). The line switching server 5 uses a predetermined protocol to connect the speech communication between the telephone 1 and the telephone 2. For example, the line switching server 5 may use SIP (Session Initiation Protocol) or an H.323 protocol and connect the speech communication between the telephone 1 and the telephone 2. Here, it is important that the line switching server 5 can carry out the speech communication connection between the telephone 1 and the telephone 2, and the system is not specifically limited.

The call state notifying section 52 in the line switching server 5 detects that the speech communication is started between the telephone 1 and the telephone 2, from the line switching section 51. The call state notifying section 52 transmits a speech communication start notice message to the call state receiving section 61 in the message relay server 6 to indicate that the speech communication is started between the telephone 1 and the telephone 2 (Step S7). One example of the speech communication start notice message is shown below:

"CALL FROM=1001 TO=1002"

The speech communication start notice message indicates that the speech communication has been started from a telephone number "1001" to a telephone number "1002".

The call state receiving section 61 receives the speech communication start notice message. The call state receiving section 61 notifies the speech communication start notice message to the call state control section 62. The call state control section 62 acquires a telephone number of the telephone 1 that is a call source, and a telephone number of the telephone 2 that is a call destination. The call state control section 62 stores the call state data between the telephone 1 and the telephone 2 as a data "Busy" in the call state storage section 63 (Step S8). For example, it is supposed that the call state control section 62 stores the speech communication start notice message in the call state storage section 63. In this case, the call state storage section 63 stores the call state data as shown in FIG. 3A in accordance with the speech communication start notice message. With reference to FIG. 3A, as for the telephone number "1001" (Telephone 1) and the telephone number "1002" (Telephone 2), the call state data is stored to indicate the "Busy" state. It should be noted that the call state storage section 63 can also store the three or more telephone numbers. In this case, it is shown that by using the three or more telephones, the speech communication is performed between three or more ends. In this way, the message relay server 6 stores a data of the speech communication performed between the telephone 1 and the telephone 2.

(Cooperation Between Telephone and Client Terminal)

Figure 9:
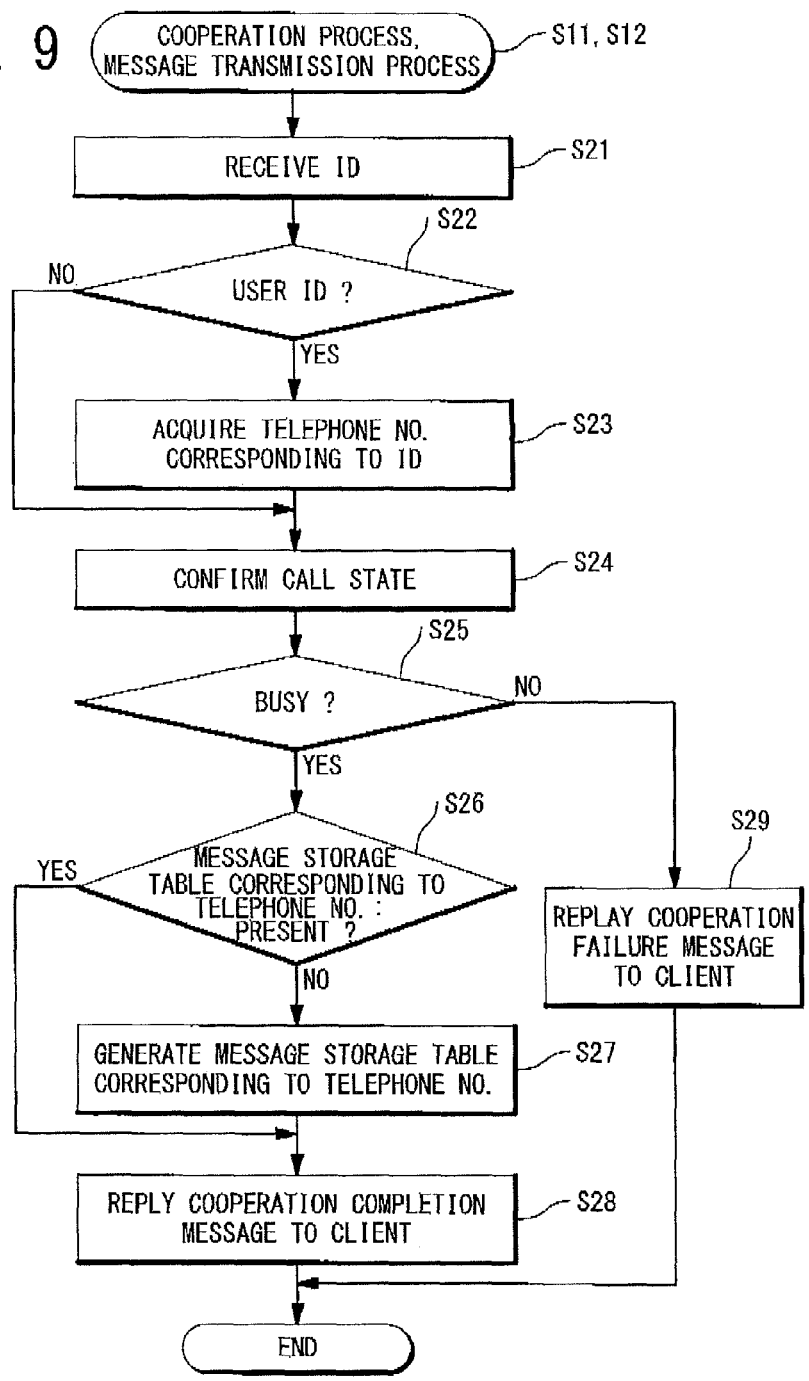
FIG. 9 is a flowchart showing an operation of the message relay system.

A cooperation process between the telephone 1 and the client terminal 3 will be described below with reference to FIGS. 8 and 9. FIG. 9 shows the operation in the cooperation process between the telephone 1 and the client terminal 3 and a message transferring process between the client terminals 3 and 4. The user A of the telephone 1 starts the client terminal 3 in order to transmit and receive the message to and from the user B who is the counter end of the speech communication (Step S9). The call cooperation section 33 of the client terminal 3 acquires the ID (identification) data to specify the user (client terminal) from the ID acquiring section 32. The ID is inputted to the client terminal 3 by the user A. Or, the ID may be preset inside the client terminal 3. The call cooperation section 33 transmits an ID notice message, which includes the ID of the user A, to the message relay server 6 through the client-side transceiver section 31 (Step S10). One example of the ID notice message is shown below:

"ID=abc"

The above ID notice message indicates that the ID of the user A who uses the client terminal 3 is "abc". It should be noted that the call cooperation section 33 may acquire the telephone number from the ID acquiring section 32, instead of the ID. In this case, the user A inputs the telephone number of the call destination, instead of the ID, to the ID acquiring section 32. The call cooperation section 33 transmits the ID notice message, which includes the telephone number, to the message relay server 4. One example of the ID notice message in this case is shown below:

"PHONE=1002"

The above ID notice message indicates that the telephone number of the user who uses the client terminal 3 is "1002".

It should be noted that whether data inputted to the ID acquiring section 32 by the user A is an ID or a telephone number is determined in accordance with the pre-setting of the client terminal 3. Or, whether the data inputted to the ID acquiring section 32 by the user A is the ID or the telephone number may be determined by the specification of the application program 34. Also, in this embodiment, the ID acquiring section 32 acquires the ID and the telephone number that are directly inputted by the user. However, the ID and the telephone number may be preset to the client terminal 3 in advance. Or, the ID acquiring section 32 may access a different system and acquire the ID and the telephone number. Also, the ID acquiring section 32 may transmit the ID notice message which includes a secret data such as a password in addition to the foregoing data. Or, the ID acquiring section 32 may encrypt a data such as the ID, the telephone number and the password, and transmit it.

The message relay server 6 carries out the cooperation process (Step S11) for making the telephone and the client terminal cooperate to be operated by the same user. Then, the message relay server 6 executes a relay process of the message between the client terminals in cooperation with the telephones of the users in the communication with each other (Step S12).

The detailed operation of the cooperation process executed by the message relay server 6 will be described below with reference to FIG. 9. FIG. 9 shows the operation of the cooperation process executed by the message relay server 6. At first, the server-side transceiver section 64 in the message relay server 6 receives the ID notice message from the client terminal 3 (Step S21). The server-side transceiver section 64 outputs the ID notice message to the cooperation state control section 66. The cooperation state control section 66 receives the ID notice message from the server-side transceiver section 64. The cooperation state control section 66 determines whether the data included in the ID notice message is the ID or the telephone number (Step S22). If the ID is included in the ID notice message (Step S22, YES), the cooperation state control section 66 extracts the telephone number for the ID included in the ID notice message, from the cooperation state storage section 67 (Step S23). FIG. 4 shows one example of the data stored in the cooperation state storage section 67. With reference to FIG. 4, data "abc" and "def" have been stored as the IDs in the cooperation state storage section 67. Also, the cooperation state storage section 67 relates the telephone number "0001" to the ID "abc" and the telephone number "1002" to the ID "def", respectively, and stores them. In this way, the cooperation state control section 66 specifies the telephone number for the ID included in the ID notice message in accordance with the correspondence relation between the ID and the telephone number that have been stored in the cooperation state storage section 67. It should be noted that the cooperation state storage section 67 relates the larger number of the IDs and the telephone numbers and stores them, without any limitation to the example in FIG. 4.

The cooperation state control section 66 in the message relay server 6 inquires the call state data for the telephone number of the notified ID (hereinafter, to be referred to as a transmission source telephone number) to the call state control section 62 (Step S24). The call state control section 62 determines whether or not the transmission source telephone number, is busy, based on the call state data stored in the call state storage section 63. The call state control section 62 notifies the call state data for the transmission source telephone number to the cooperation state control section 66. If the call state data for the transmission source telephone number indicates the "Busy" state (Step S25, YES), the cooperation state control section 66 inquires to the message relay section 68, whether or not the message storage tables have been generated for the transmission source telephone number and a telephone number of a call destination from a telephone with the transmission source telephone number (hereinafter, to be referred to as a transmission destination telephone number) (Step S26). If the message storage tables for the transmission source telephone number and the transmission destination telephone number are not prepared in the message storage section 65, the message relay section 68 newly generates the message storage tables for the transmission source telephone number and the transmission destination telephone number (hereinafter, to be referred to as a transmission source message storage table and a transmission destination message storage table, respectively) (Step S27).

FIG. 5A shows one example of the message storage table. The message storage table shown in FIG. 5A indicates an example of a message storage table for the telephone number "1001". One row of the message storage table corresponds to one message transmitted or received by each of the client terminals 3 and 4. Thus, as described later, one "row" is added to the message storage table, for each addition of the message. It should be noted that the message storage section 65 stores the message storage table for each telephone number whose call state is busy.

FIG. 5B shows one example of the state in which a message is added to the message storage table. The message storage table in FIG. 5B is a message table for the telephone number "10.01". The first row of the message storage table in FIG. 5B indicates that a message "Hello" is transmitted from the client terminal for the telephone number "1001" to the client terminal for the telephone number "1002". Also, the second row of the message storage table indicates that a message "Hi" is received from the client terminal for a telephone number "1003" to the client terminal for the telephone number "1001". Then, since a reception state indicates a data "Yet", the row indicates that the message "Hi" is not transmitted to the client terminal for the telephone number "1001". In this way, the message storage table stores the messages received from the client terminals 3 and 4.

When the call states for the transmission source telephone number and the transmission destination telephone number are in the busy state, the cooperation state control section 66 generates a cooperation data. The cooperation state control section 66 transmits a cooperation completion message including the cooperation data to the client terminal 3 through the server-side transceiver section 64 (Step S28). One example of the cooperation completion message is shown below:

"STATUS=ok & PHONE=1001"

The above cooperation completion message indicates that the relation has been normally performed. Also, the above cooperation completion message indicates that the telephone number "1001" has been related to the client terminal 3. It should be noted that in the cooperation data in this embodiment, the transmission source telephone number is specified as it is. However, any type of data from which the relating in the cooperation state control section 66 can be checked may be used.

As mentioned above, the telephone 1 and the client terminal 3 that are operated by the user A are related to each other. Also, the cooperation process is similarly performed on the telephone 2 and the client terminal 4. It should be noted that as the cooperation data, data other than the telephone number and the ID can be used. In that case, the data and the telephone number may be stored in the cooperation state storage section 67 in relation to each other.

On the other hand, if the transmission source telephone number notified from the client terminal 3 is not stored in the cooperation state storage section 67, or if the call state of the transmission source telephone number is not in the busy state (Step S25, NO), the cooperation state control section 66 replies a cooperation failure message to the client terminal 3 through the server-side transceiver section 64 (Step S29, and Step 12 in FIG. 8). One example of the cooperation failure message is shown below:

"STATUS=fail"

The client-side transceiver section 31 in the client terminal 3 receives the cooperation failure message. The client-side transceiver section 31 outputs the cooperation failure message to the call cooperation section 33. When receiving the cooperation failure message, the call cooperation section 33 notifies a cooperation failure to the application program 34. When the cooperation failure is notified, the application program 34 starts a cooperation failure process (Step S13 in FIG. 8). In the cooperation failure process, a process for notifying the cooperation failure to the user, a process for ending the client terminal 3, or a process for displaying a cooperation failure data that is set in advance is executed. It should be noted that the cooperation failure process is based on the installation of the client terminal 3 and not limited.

The client-side transceiver section 31 receives the cooperation completion message. The client-side transceiver section 31 outputs the cooperation completion message to the call cooperation section 33. The call cooperation section 33 stores the cooperation data (the telephone number "1001" in the above example) included in the cooperation completion message. The call cooperation section 33 notifies the cooperation completion to the application program 34 (Step S28, and Step S12 in FIG. 8). When the cooperation completion is notified, the application program 34 executes the respective functions of the client terminal 3 (Step S13 in FIG. 8). After that, the client terminal 3 is connected to the message relay server 6 and can carry out the message exchange. In short, the message relay server 6 executes the relaying process for the exchange of the messages between the client terminals 3 and 4 operated by the users A and B, who are in the speech communication.

(Message Transmitting Process)

Figure 10:
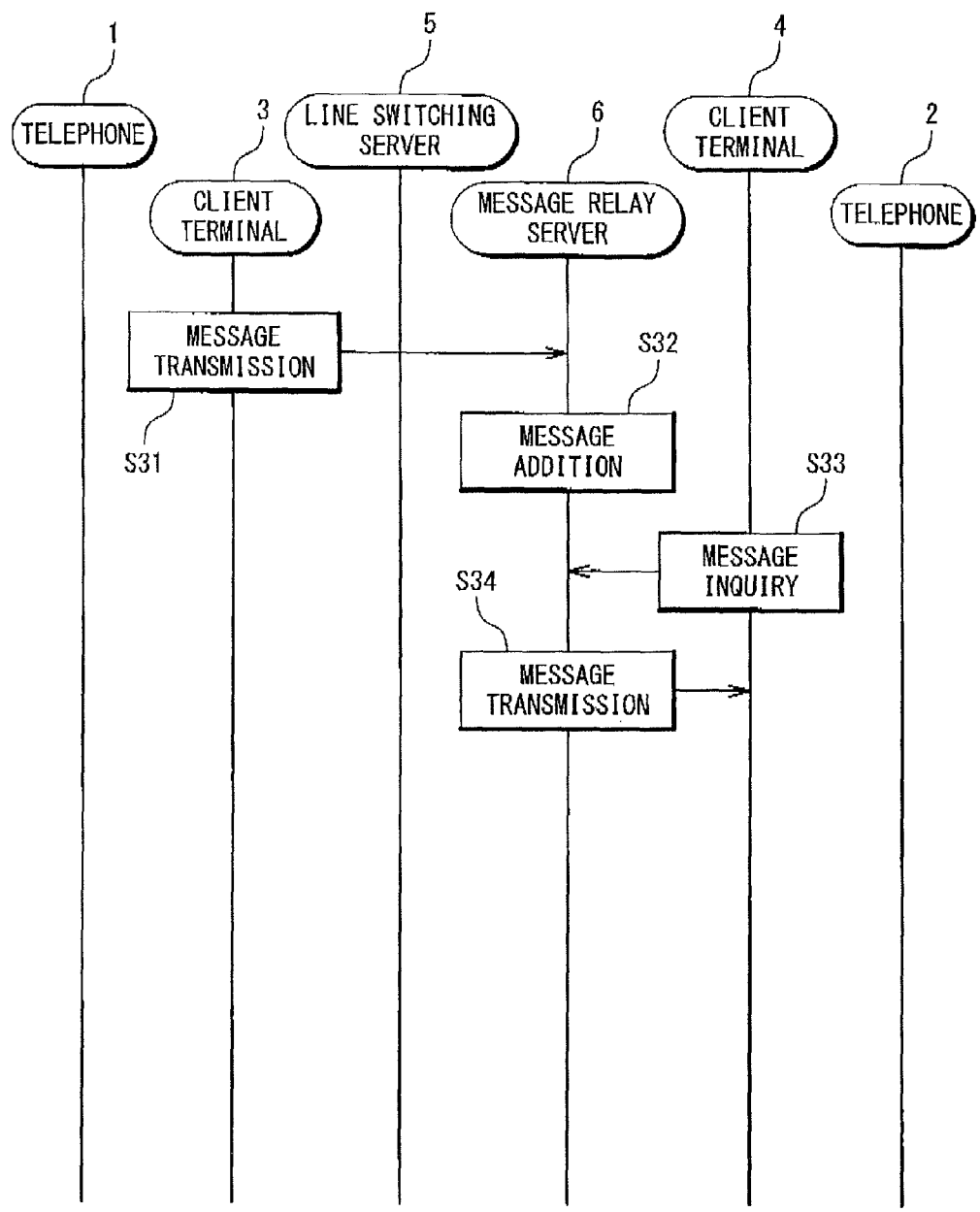
FIG. 10 is a sequence diagram showing an operation of the message relay system.
Figure 11:
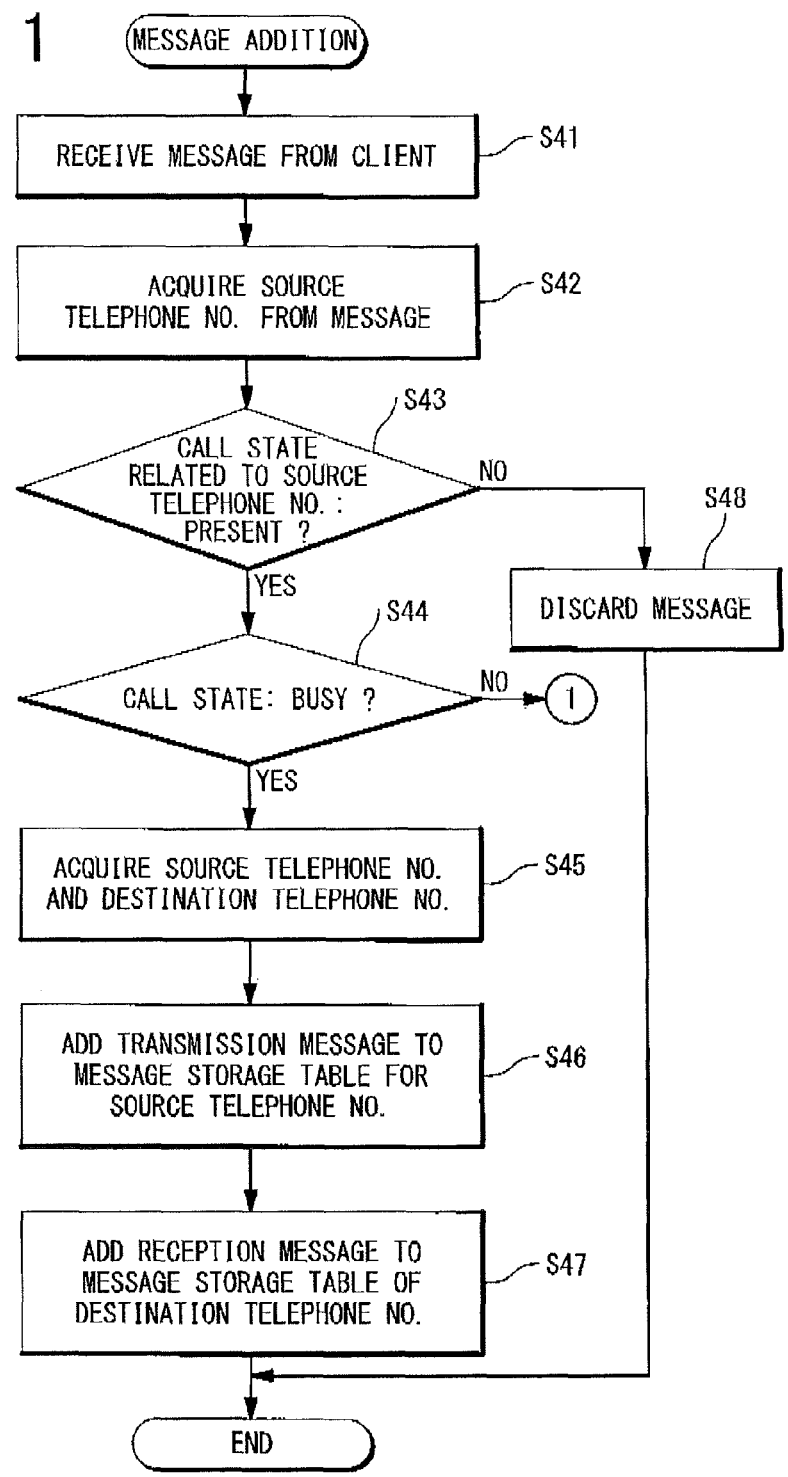
FIG. 11 is a flowchart showing an operation of the message relay system.

An operation when the client terminal 3 transmits a message to the client terminal 4 will be described below with reference to FIGS. 10 to 12. FIG. 10 shows an operating when the client terminal 3 transmits a message to the client terminal 4. When the client terminal 3 transmits the message to the client terminal 4, the application program 34 in the client terminal 3 34 instructs the client-side transceiver section 31 to transmit the message. The client-side transceiver section 31 acquires the telephone number of the telephone 1 (the cooperation data) acquired at the time of the cooperation process. The client-side receiver 31 adds the telephone number of the telephone 1 to the message and transmits to the message relay server 6 (Step S31). The server-side transceiver section 64 in the message relay server 6 receives the message from the client terminal 3. One example of the message received by the message relay server is shown below;

"PHONE=1001 & MESSAGE="Hello""

The above example indicates that the message relay server receives the message "Hello" from the client terminal 3 for the telephone number "1001".

The message relay server 6 adds the message received from the client terminal 3 to the message storage table (Step S32). The message relay server 6 receives an inquiry of whether or not any not-yet-notified message exists, from the client terminal 4 (Step S33). The message relay server 6 transmits the message addressed to the client terminal 4 which has been stored in the message storage table, to the client terminal 4 (Step S34).

The operating method of a message adding process executed by the message relay server 6 will be described below in detail with reference to FIG. 11. FIG. 11 shows the operation of the message adding process executed by the message relay server 6. The server-side transceiver section 64 in the message relay server 6 receives the message from the client terminal 3 (Step S41). The server-side transceiver section 64 outputs the message to the message relay section 68. The message relay section 68 receives the message from the server-side transceiver section 64. The message relay section 68 extracts the cooperation data included in the message. The message relay section 68 inquires to the cooperation state control section 66, the telephone number for the cooperation data (hereinafter, to be referred to as the transmission source telephone number). The cooperation state control section 66 extracts the transmission source telephone number from the cooperation state storage section 67. The cooperation state control section 66 sends the transmission source telephone number to the message relay section 68 (Step S42). It should be noted that this process is omitted when the cooperation data included in the message is the telephone number (the transmission source telephone number). When acquiring the transmission source telephone number, the message relay section 68 inquires the call state data of the transmission source telephone number to the call state control section 62 (Step S43). The call state control section 62 extracts the call state data for the transmission source telephone number from the call state storage section 63. If the call state storage section 63 does not have any call state data for the transmission source telephone number, the call state control section 62 replies that there is not any call state data, to the message relay section 68 (Step S43, NO). When receiving the reply indicating that there is not the call state data for the transmission source telephone number, from the call state control section 62, the message relay section 68 discards the message (Step S48). In this case, the message relay section 68 may reply a notice indicating that the call state data for the transmission source telephone number has not been stored (not busy), to the client terminal 3.

If the call state storage section 63 stores the call state data for the transmission source telephone number (Step S43, YES), the call state control section 62 checks whether or not the call state for the transmission source telephone number is in the "Busy" state. If the call state for the transmission source telephone number is in the "Busy" state (Step S44, YES, and refer to FIG. 3A), the call state control section 62 replies the telephone number of the counter end to the transmission source telephone number (hereinafter, to be referred to as the transmission destination telephone number) to the message relay section 68. The message relay section 68 acquires the transmission destination telephone number from the call state control section 62 (Step S45). When the telephone number "1001" and the telephone number "1002" are in the "Busy" state and when the transmission source telephone number is "1001", the transmission destination telephone number is "1002".

The message relay section 68 stores the message as a transmission message in the message storage table for the transmission source telephone number in the message storage section 65 (Step S46). FIG. 6A shows a case that the above message is stored in the message storage table for the telephone number "1001". The message storage table in FIG. 6A is the message storage table for the telephone number "1001". As shown in FIG. 6A, from the message storage table for the telephone number "1001", it is possible to confirm that the message "Hello" and the transmission destination telephone number "1002" are related and stored. The message storage table in this example indicates that the message "Hello" is transmitted from the client terminal 3 (for the transmission source telephone number "1001") to the client terminal 4 (for the transmission destination telephone number "1002").

In succession, the message relay section 68 stores the message as a reception message, in the message storage table for the transmission destination telephone number (the telephone number "1002" of the telephone 2) (Step S47). FIG. 6B shows a case that the above message is stored in the message storage table for the transmission destination telephone number "1002". The message storage table in FIG. 6B is a message storage table for the transmission destination telephone number "1002". As shown in FIG. 6B, from the message storage table for the transmission destination telephone number "1002", it is possible to confirm that the message "Hello", the transmission source telephone number "1001" and the reception state have been related and stored. The message storage table in this example shows that the message "Hello" is transmitted from the client terminal 3 (for the transmission source telephone number "1001") to the client terminal 4 (for the transmission destination telephone number "1002"). Also, since the data "Yet" is stored in the field of the reception state in the message storage table, this data indicates that the client terminal 4 does not receive the reception message.

As mentioned above, when the call states of the telephone 1 and the telephone 2 are in the "Busy" state, the message relay server 6 stores the message transmitted from the client terminal 3, as the transmission message in the message storage table for the transmission source telephone number (the telephone 1) cooperated with the client terminal 3. Also, similarly, the message relay server 6 stores the message transmitted from the client terminal 3 as the reception message in the message storage table fore transmission destination telephone number (the telephone 2) cooperated with the client terminal 4. For this reason, the client terminal 4 can receive the received reception message that is addressed to the self-terminal.

(Message Receiving Process)

An operating when the client terminal 4 receives the message from the message relay server 6 will be described below with reference to FIG. 12. FIG. 12 shows the operation when the client terminal 4 receives the message from the message relay server 6. The application program 44 of the client terminal 4 instructs the client-side transceiver section 41 to inquire the reception message (hereinafter, to be referred to as the message inquiry). The application program 44 carries out a message inquiry for each predetermined constant time. Or, the message inquiry may be carried out in accordance with a command inputted from the user B using the client terminal 4. The client-side transceiver section 41 acquires the cooperation data to the telephone 2 obtained at the time of the cooperation process. The client-side transceiver section 41 performs a message inquiry, which includes the cooperation data to the telephone 2, on the server-side transceiver section 64 (Step S33 in FIG. 10). The server-side transceiver section 64 receives the message inquiry from the client-side transceiver section 41. The server-side transceiver section 64 notifies the message inquiry from the client terminal 4 to the message relay section 68 together with the cooperation data (Step S51). The message relay section 68 receives the message inquiry together with the cooperation data. The message relay section 68 inquires to the cooperation state control section 66, the telephone number (hereinafter, to be referred to as the transmission destination telephone number) for the cooperation data. The cooperation state control section 66 extracts the telephone number for the cooperation data from the cooperation state storage section 67. The cooperation state control section 66 replies the transmission destination telephone number to the message relay section 68. The message relay section 68 acquires the transmission destination telephone number from the cooperation state control section 66. It should be noted that this process is omitted when the cooperation data included in the message inquiry is the telephone number. The message relay section 68 searches the message storage section 65 to know whether or not any reception message exists in the message storage table for the transmission destination telephone number (Step S52). If any reception message does not exist in the message storage table for the transmission destination telephone number, the message relay section 68 replies a notice indicating that any message does not exist, to the client terminal 4 through the server-side transceiver section 64. In this case, this operation is ended. On the other hand, if any reception message exists in the message storage table for the transmission destination telephone number, the message relay section 68 extracts the reception message (Step S52, YES, Step 53). The message relay section 68 checks the reception state stored in the reception state field of the reception message (Step S54).

If the reception state field of the reception message is empty " " (that indicates the transmission message), or if the data "Done" is stored, the message relay section 68 does not especially carry out any operation (Step S54, YES). In this case, the message relay section 68 advances to a process for a next message. On the other hand, if the data "Yet" is stored in the reception state field of the reception message (No at Step S54, and Yes at Step S55), the message relay section 68 transmits the reception message to the client terminal 4 through the server-side transceiver section 64. The server-side transceiver section 64 transmits the reception message to the client-side transceiver section 41 in the client terminal 4 (Step S56). Simultaneously, the message relay section 68 changes the reception state of the reception message to the data "Done" in the message storage table for the transmission destination telephone number (Step S57). Consequently, the message relay section 68 can recognize that the reception message has been already transmitted to the client terminal 4. From the above description, it is supposed that the message storage table for the telephone number "1002" is in the state of FIG. 6B. When receiving the message inquiry for the telephone number "1002", the message relay section 68 replies the following message to the client terminal 4:

"PHONE-1001 & MESSAGE="Hello""

Also, FIG. 60 shows a state that the reception state field of the reception message has been changed to the data "Done" in the message storage table for the telephone number "1002". After that, the message relay section 68 repeats the above process for the number of the reception messages. If there is not any message that can be transmitted to the client terminal 4, the message relay section 68 may reply a notice indicating that there is not any reception message, to the client terminal 4 through the server-side transceiver section 64. It should be noted that when the message is extracted at the step S53, the reception message in which the reception state field is the data "Done" or " " may be removed in order to make the speed of the process higher.

(Cooperation Process at Time of Transfer)

Figure 13:
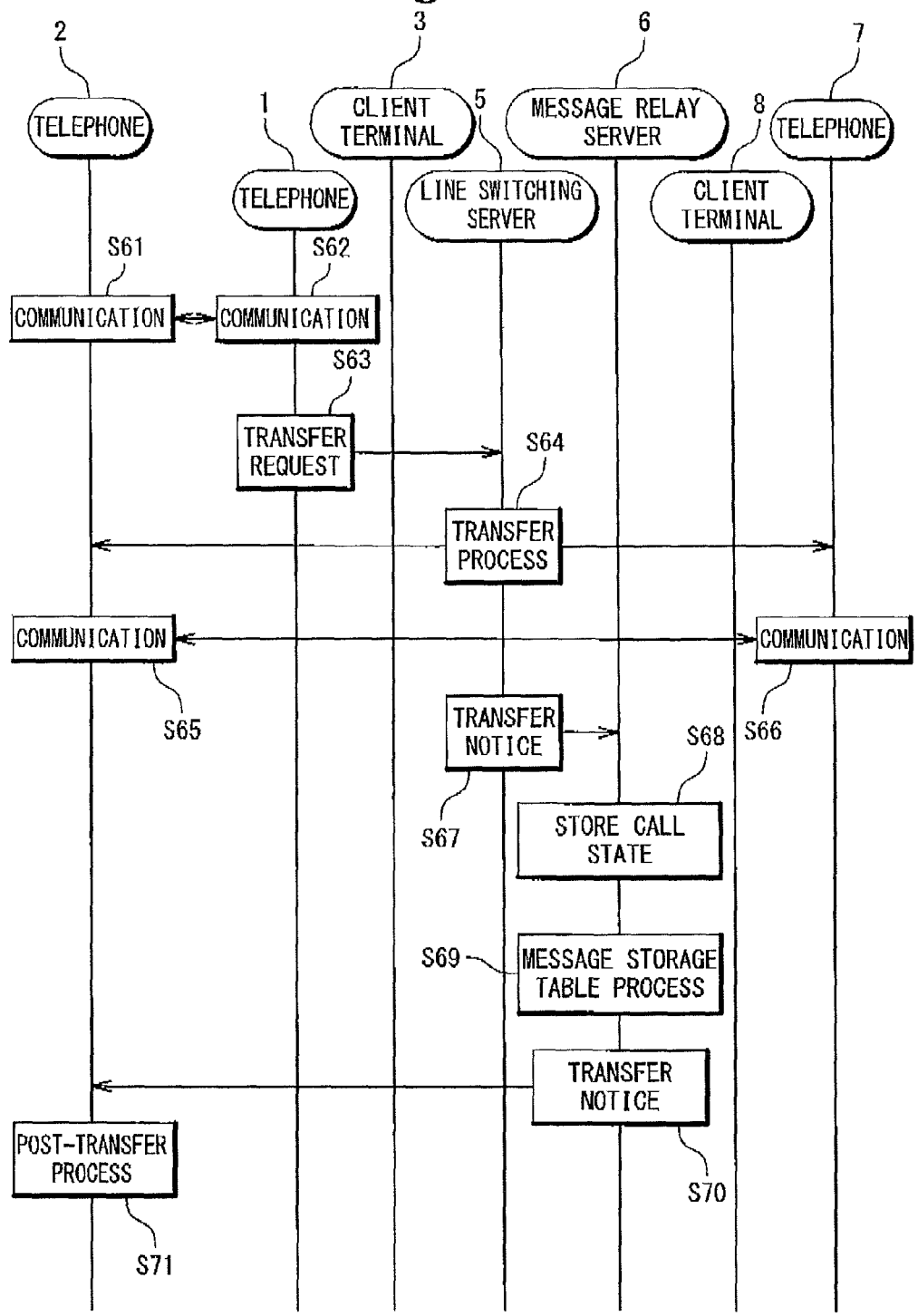
FIG. 13 is a sequence diagram showing the operation of the message relay system.
Figure 14:
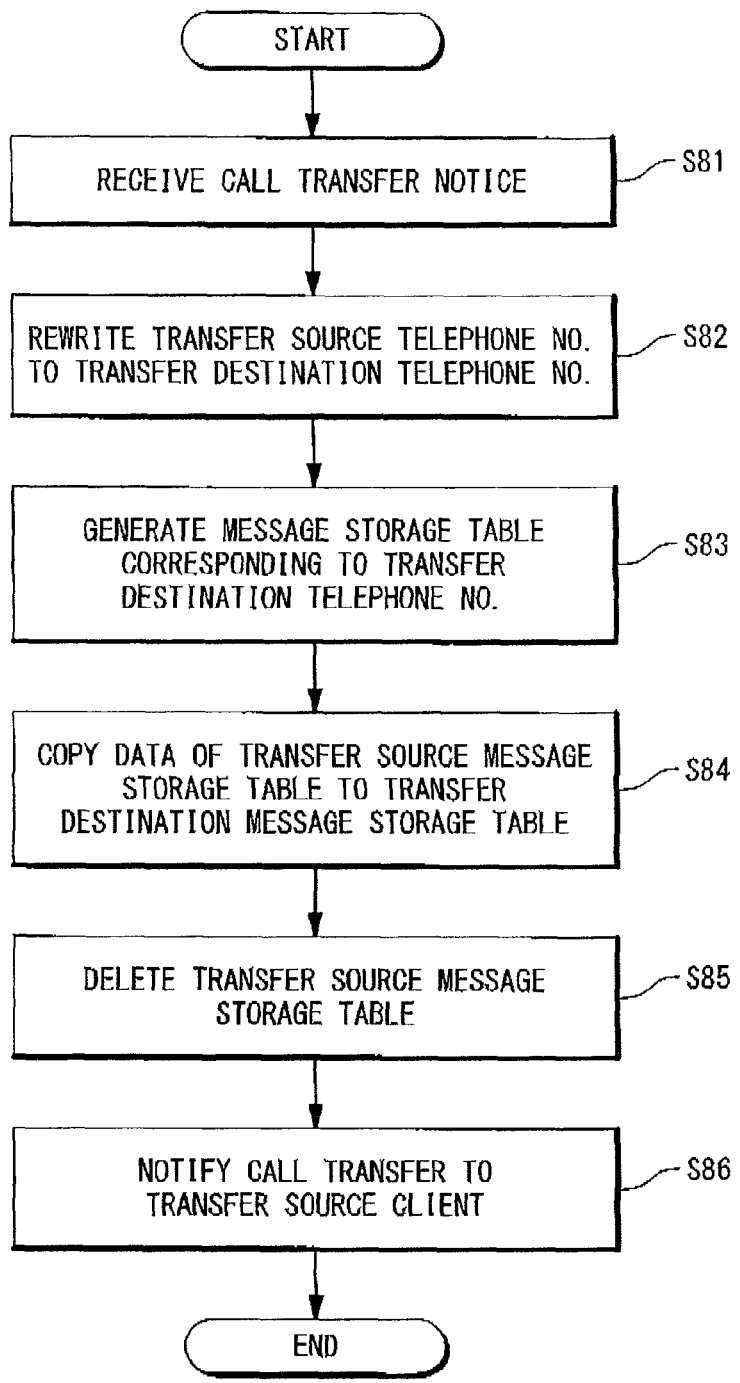
FIG. 14 is a flowchart showing an operation of the message relay system.

An operation when the user A transfers a speech communication call from the telephone 1 will be described below with reference to FIGS. 13 and 14. FIGS. 13 and 14 show the operation when the user A transfers the speech communication call from the telephone 1. At first, while performing the speech communication with the user B (Steps S61, S62), the user A performs a predetermined operation to input transfer of the speech communication call to the telephone 1. The telephone 1 notifies the transfer of the speech communication call to the line switching server 5 in accordance with the input from the user A (Step S63). The line switching section 51 in the line switching server 5 executes a predetermined process and transfers the speech communication call from the telephone 1 (Step S64). In this embodiment, the speech communication call between the telephone 1 of the user A and the telephone 2 of the user B is transferred to a speech communication call between the telephone 2 of the user B and a telephone 7 (the telephone number "1003") of the user C (Steps S65, S66). In short, the call destination of the telephone 2 is transferred from the telephone 1 to the telephone 7.

The call state notifying section 52 in the line switching server 5 detects the transfer of the speech communication call. The call state notifying section 52 transmits a call transfer notice message to the call state receiving section 61 in the message relay server 6 to indicate that the call is transferred (Step S67). One example of the call transfer notice message is shown below:

"TRANSFER FROM=1001 TO=1003"

The above call transfer notice message indicates that the call is transferred from a transfer source telephone number "1001" to a transfer destination telephone number "1003".

In succession, the call state receiving section 61 in the message relay server 6 receives the call transfer notice message (Step S81 in FIG. 14). The call state receiving section 61 outputs the call transfer notice message to the call state control section 62. The call state control section 62 receives the call transfer notice message from the call state receiving section 61. The call state control section 62 acquires a transfer source telephone number and a transfer destination telephone number which are included in the call transfer notice message. The call state control section 62 rewrites the transfer source telephone number to the transfer destination telephone number, in the call state data stored in the call state storage section 63 (Step S68 in FIG. 13 and Step S82 in FIG. 14). FIG. 3A shows the call state data between the telephone number "1002" and the telephone number "1001" stored in the call state storage section 63. For example, when the speech communication call is transferred from the transfer source telephone number "1001" to the transfer destination telephone number "1003", the call state control section 62 rewrites the calling destination of the telephone number "1002" from the transfer source telephone number "1001" to the transfer destination telephone number "1003". FIG. 3B shows the call state storage section 63, after the call state control section 62 rewrites the call state data.

The call state control section 62 notifies that the call is transferred from the transfer source telephone number "1001" to the transfer destination telephone number "1003", to the message relay section 68. The message relay section 68 newly generates a message storage table for the transfer destination telephone number "1003" (hereinafter, to be referred to as a transfer destination message storage table) in the message storage section 65 (Step S83). The message relay section 68 copies the contents of the message storage table for the transfer source telephone number "1001" (hereinafter, to be referred to as a transfer source message storage table) to the message storage table for the transfer destination telephone number "1003" (hereinafter, to be referred to as the transfer destination message storage table) (Step S84). At this time, the message relay section 68 writes a data "Transfer" in the reception state fields of all of the messages, which have been copied to the transfer destination message storage table. FIG. 7 shows the transfer destination message storage table, after the message relay section 68 copies the message stored in the transfer source message storage table to the transfer destination message storage table. In this way, the messages that are transmitted or received by the client terminal 1 for the transfer source telephone number "1001" can be inherited by a client terminal 8 for the transfer destination telephone number "1003". At the time of the completion of the message copy, the message relay section 68 deletes the transfer source message storage table for the transfer source telephone number "1001" (Step S85). This is because the transfer source message storage table becomes unnecessary after the speech communication call is transferred. In this way, the message relay server 6 deletes or treats the message storage table for each telephone in response to the change in the call state (Step S69 in FIG. 13).

The call state control section 62 transmits a call transfer message to the client terminal 3 through the server-side transceiver section 64 in cooperation with the transfer source, telephone number "1001" (Telephone 1) (Step S70 in FIG. 13 and Step S86 in FIG. 14). One example of the call transfer message is shown below:

"STATUS=transfer"

The client-side transceiver section 31 receives the call transfer message from the message relay server 6. When receiving the call transfer message, the client-side transceiver section 31 notifies the transfer of the speech communication call to the application program 34. The application program 34 starts a process when the call is transferred (Step S71 in FIG. 13). As the processes executed by the application program 34 when the call is transferred, a process for notifying that the call is transferred to the user, a process for ending the operation of the client terminal 3 and a process for displaying a preset data are executed. However, the process when the call is transferred is based on the implementation in the client terminal 3 and not limited to them.

Also, the transfer destination telephone number "1003" (Telephone 7) and the client terminal 8 that are used by the user C execute the cooperation process from the step S21 to the step S28 in FIG. 9 as mentioned above. At this time, the message storage table for the transfer destination telephone number "1003" (Telephone 7) is already generated. Thus, the message storage table is not required to be newly generated.

Figure 12:
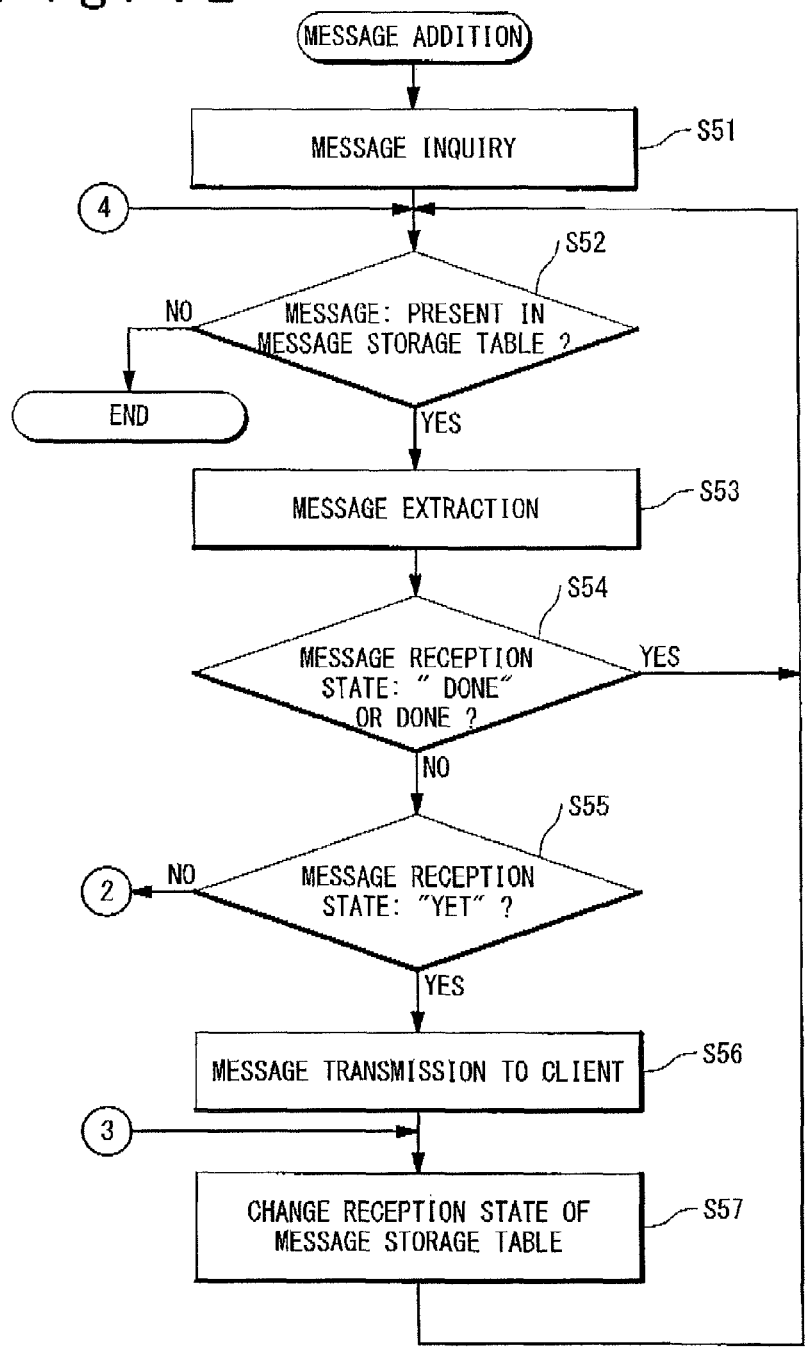
FIG. 12 is a flowchart showing an operation of the message relay system.
Figure 15:
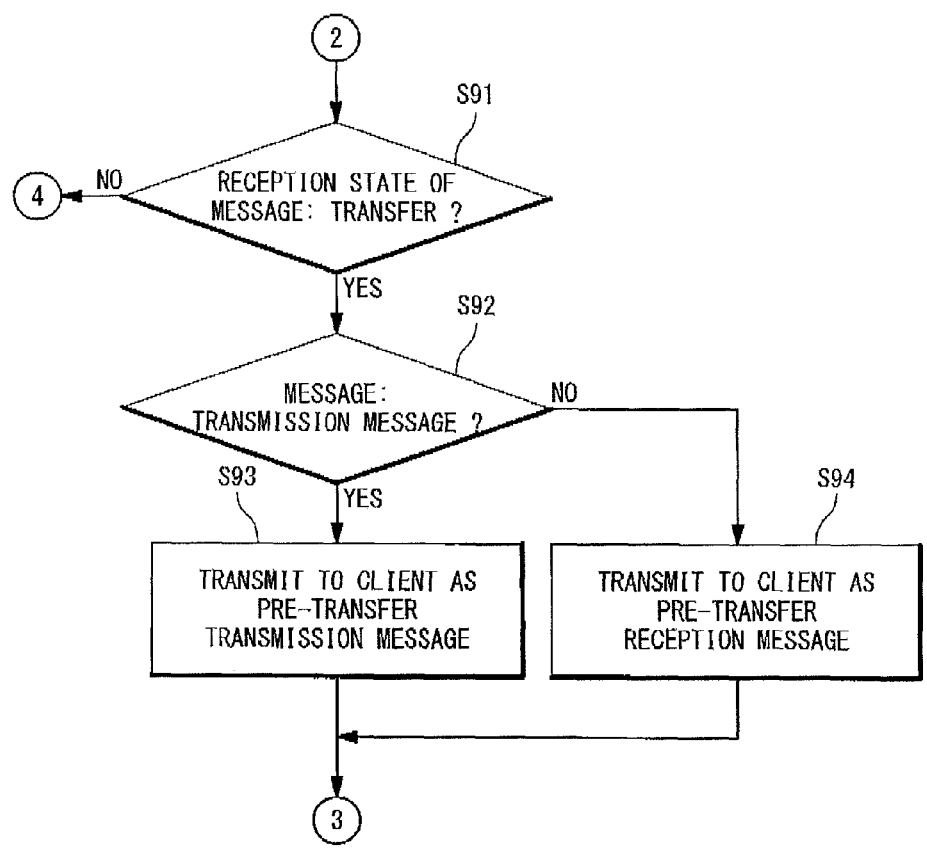
FIG. 15 is a flowchart showing an operation of the message relay system.

When the cooperation process is completed, the client terminal 8 executes the above message receiving process (from the step S51 to the step S57 in FIG. 12). At this time, the operation of the message relay server 6 slightly differs from the above-mentioned operation. Specifically, the operation shown in FIG. 15 is added. This will be described below with reference to FIG. 15.

At the step S54 and the step S55, when the reception state field of the message is not the data " ", "Done" or "Yet", the message relay section 68 checks whether or not the reception state field of the message is the data "Transfer" (Step S91). If the reception state field of the message is the data "Transfer", the message relay section 68 checks whether the message is a transmission message or a reception message (Step S92). If the message is the transmission message, the message relay section 68 transfers it as a pre-transfer transmission message before the transfer to the client terminal 8 (Step S93). On the other hand, if the message is the reception message, the message relay section 68 transmits it as a pre-transfer reception message before the transfer to the client terminal 8 (Step S94). The message relay section 68 determines whether the message is the transmission message or reception message, based on which of the destination field or the source field in the transfer destination message storage table the telephone numbers are stored in. FIG. 7 shows the transfer destination message storage table. Examples of the message that is transmitted by the message relay section 68 in accordance with the transfer destination message storage table is shown below:

"TRANSFER=send & MESSAGE="Hello""
"TRANSFER=receive & MESSAGE="Hi""

The message on the above first row indicates the pre-transfer transmission message, which is transferred by the transfer source client terminal 3 before the transfer. Also, the message on the second row indicates the pre-transfer reception message, which is received by the transfer source client terminal 3 before the transfer. As mentioned above, the transfer destination client terminal 8 can obtain the message that is scheduled to be transmitted by the transfer source client terminal 3 or received by the transfer source client terminal 3.

In this way, after the transfer, the message can be transmitted or received between the client terminal 4 in cooperation with the telephone 2 and the client terminal 8 in cooperation with the telephone 7.

(Cooperation Process when Holding is Started)

Figure 16:
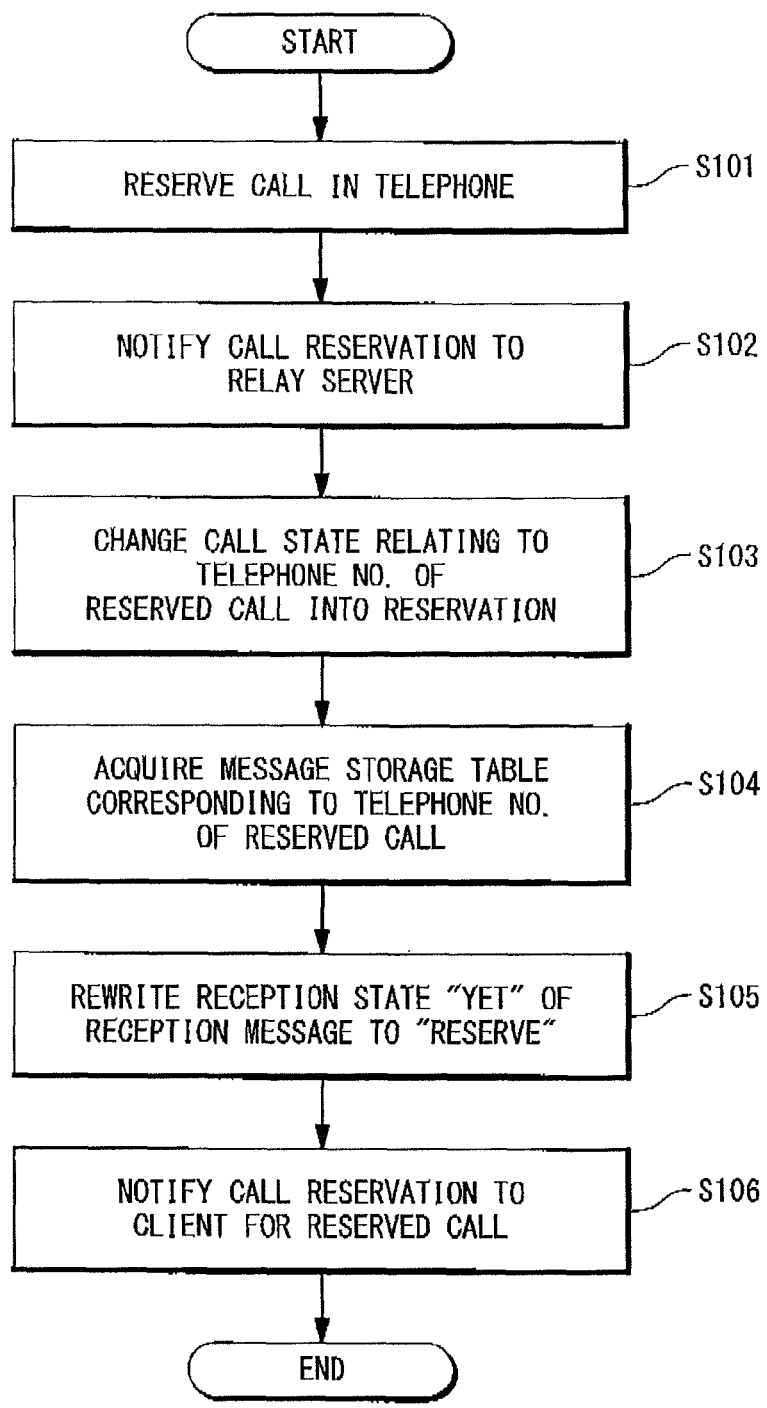
FIG. 16 is a flowchart showing an operation of the message relay system.

An operation when the telephone 1 holds the speech communication call will be described below with reference to FIG. 16. FIG. 16 shows the operation when the telephone 1 holds the speech communication call in the speech communication between the telephone 1 and the telephone 7. The user A performs a predetermined operation on the telephone 1 during the speech communication, in order to hold the call. The telephone 1 notifies call holding to the line switching server 5. The line switching section 51 in the line switching server 5 holds the call of the telephone 1 whose the call holding is notified (Step S101).

When detecting the call holding, the call state notifying section 52 in the line switching server 5 transmits a call holding message to the call state receiving section 61 in the message relay server 6 to indicate that the call is held (Step S102). One example of the call holding message is shown below:

"HOLD ON FROM=1001"

The above call holding message indicates that the telephone 1 (the telephone number "1001") holds the call.

The call state receiving section 61 receives the call holding message. The call state receiving section 61 outputs the call holding message to the call state control section 62. When receiving the call holding message, the call state control section 62 acquires the held telephone number of the telephone (hereinafter, to be referred to as a holding source telephone number) from the call holding message. The call state control section 62 extracts the call state data for the holding source telephone number from the call state storage section 63. The call state control section 62 rewrites the call state data for the holding source telephone number from the data "Busy" to the data "Holding" (Step S103). FIG. 3C shows the state in which the call state of the call between the telephone number "1001" and the telephone number "1003" is rewritten to the data "Holding" in the call state storage section 63.

The call state control section 62 notifies that the call of the holding source telephone number is held, to the message relay section 68. At this time, the call state control section 62 notifies the holding source telephone number together with a telephone number in the speech communication with the holding source telephone number (hereinafter, to be referred to as a holding destination telephone number). The message relay section 68 extracts the message storage table for the holding source telephone number and the holding destination telephone number from the message storage section 65 (Step S104). The message relay section 68 rewrites the reception state field into the data "Holding" to the message in which "Yet" is stored in the reception state of each message storage table (Step S105). Also, the call state control section 62 transmits a holding start notice message through the server-side transceiver section 64 to the client terminals, which are in cooperation with the holding source telephone number and the holding destination telephone number whose call state data indicate the data "Held" (Step S106). One example of the holding start notice message is shown below:

"STATUS=hold on"

The call cooperation section 33 in each client terminal 3 receives the holding start notice message from the message relay server 6 through the client-side transceiver section 31. The call cooperation section 33 notifies the call holding start to the application program 34. The application program 34 starts a predetermined process when the call holding is started. As the process when the call holding is started, a process for notifying that the call is held to the user, a process for stopping the operation of the client terminal 3, and a process for displaying a preset data are performed. However, the process when the call holding is started is based on the implementation in the client terminal 3, and not limited to them. It should be noted that similarly to the client terminal 3, the client terminal 8 also receives the holding start message from the message relay server 6 and executes the process when the holding is started.

Figure 17:
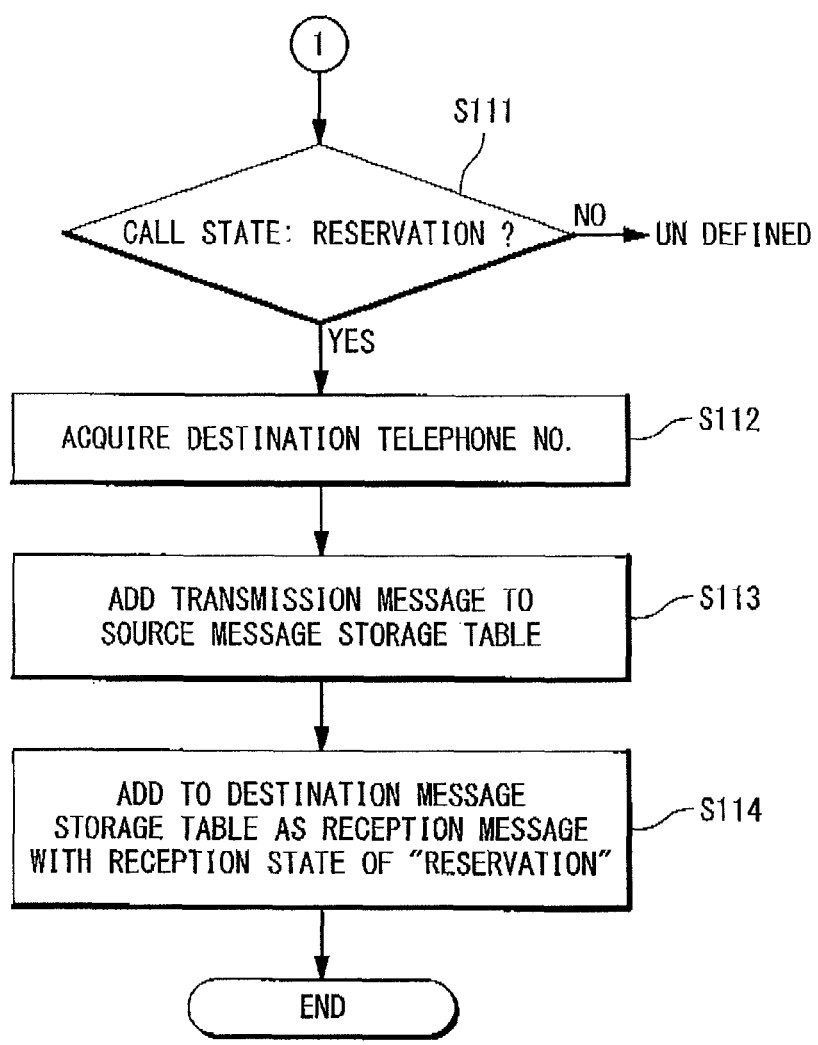
FIG. 17 is a flowchart showing an operation of the message relay system.

An operation when the client terminal 3 in the holding state transmits the message to the message relay server 6 will be described below with reference to FIG. 17. FIG. 17 shows the operation when the client terminal 3 in the holding state transmits the message to the message relay server 6. In the above operation in FIG. 11, the call state control section 62 determines whether or not the call state data for the transmission source telephone number indicates the "Busy" state, in the call state storage section 63 (Step S44). If the call state for the transmission source telephone number is not in the "Busy" state in the call state storage section 63, the call state control section 62 determines whether or not the call state data indicates the data "Holding" (Step S111). If the call state for the transmission source telephone number is in the "Holding" state in the call state storage section 63, the call state control section 62 replies the transmission destination telephone number to the message relay section 68. It should be noted that in FIG. 17, a case that the call state for the transmission source telephone number is not in the "Holding" state is defined as the "Yet" state. In this case, if there is a differently defined process, the call state control section 62 executes that process. For example, if the call state is neither the "Busy" state nor the "Holding" state, the call state control section 62 may execute a process for discarding the message. Next, the message relay section 68 acquires the transmission destination telephone number from the call state control section (Step S112). The message relay section 68 stores the message as a transmission message in the message storage table for the transmission source telephone number (Step S113). The message relay section 68 stores the reception state for the transmission message as the "Holding" state in the message storage table. Also, the message relay section 68 stores the message as a reception message in the message storage table for the transmission destination telephone number (Step S114). The message relay section 68 stores the reception state for the reception message as the "Holding" state in the message storage table.

The message relay section 68 does not replay to the client terminal, for the message in which the "Holding" state is stored in the reception state of the message storage table in the above message receiving process. When the client terminal whose call state is the "Holding" state inquires the message to the message relay server 6, the message relay section 68 replies only the message in which the "Yet" or "Transfer" is stored in the reception state, as mentioned above. For this reason, the message transmitted from the client terminal in the call state of "Holding" is not transmitted to the client terminal of the transmission destination, while the call state of "Holding" is continued. In this way, the transmission/reception of the message is stopped between the client terminals whose call states are in the "Holding" state.

(Coordinating Process when Holding is Ended)

Figure 18:
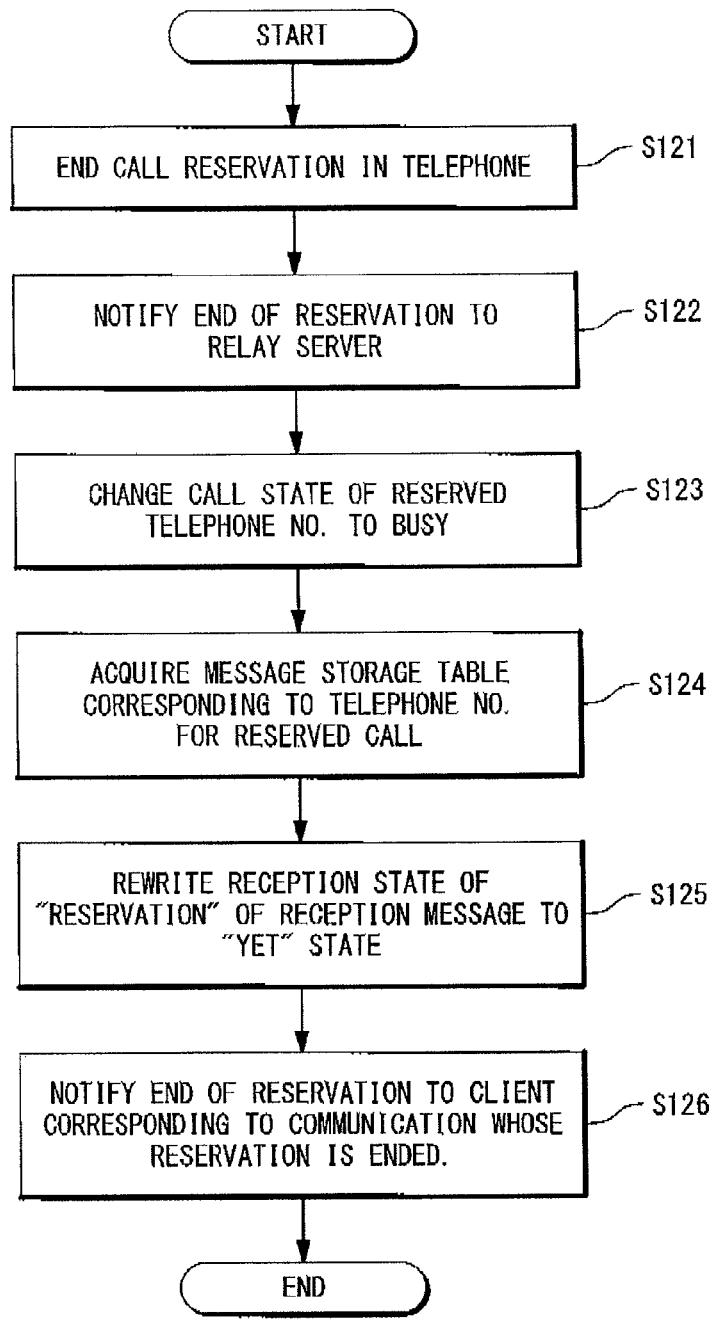
FIG. 18 is a flowchart showing an operation of the message relay system.

The process when the telephone 1 ends the call holding will be described below with reference to FIG. 18. The user A performs a preset operation for ending the holding on the telephone 1 in the holding state. The telephone 1 notifies the holding end to the line switching server 5. The line switching section 51 in the line switching server 5 changes the call state of the telephone 1 to which the holding end is notified, from the "Holding" state to the "Busy" state (Step S121).

The call state notifying section 52 detects the holding end. The call state notifying section 52 transmits a holding end message to the call state receiving section 61 in the message relay server 6 to indicate the holding end (Step S122). One example of the holding finish message is shown below;

"HOLD_OFF FROM=1001"

The above holding end message indicates the holding end of the telephone number "1001".

The call state receiving section 61 receives a holding end notice message. The call state receiving section 61 outputs the holding end message to the call state control section 62. The call state control section 62 acquires the holding source telephone number included in the holding end message. The call state control section 62 rewrites the call state data for the holding source telephone number from "Holding" to "Busy" in the call state storage section 63 (Step S123). FIG. 3D shows the state that the call state control section 62 rewrites the call state data for the holding source telephone number in the call state storage section 63.

The call state control section 62 notifies that the call holding has been ended, to the message relay section 68. At this time, the call state control section 62 sends a notice which includes the holding source telephone number and the holding destination telephone number, to the message relay section 68. The message relay section 68 extracts the message storage table for the holding source telephone number and the holding destination telephone number from the message storage section 65 (Step S124). The message relay section 68 rewrites the reception state of the message in which "Holding" is stored in the reception state to "Yet" in each message storage table (Step S125). Also, the call state control section 62 transmits the holding end notice message through the server-side transceiver section 64 to the client terminals 3 and 8 in cooperation with the holding destination telephone number and the holding source telephone number whose call holding has been ended (Step S126). One example of the holding end message is shown below;

"STATUS=hold_off"

The call cooperation section 33 in the client terminal 3 receives the holding end notice message through the client-side transceiver section 31. The call cooperation section 33 notifies the holding end to the application program 34. The application program 34 starts a process when the holding is ended. As the process when the holding is ended, a process for notifying that the holding of the call is ended to the user, a process for resuming the operation of the client terminal 3 that has been stopped while the call is held, and a process for returning a data displayed when the call is held, to the original. However, the process when the holding is ended is based on the implementation in the client terminal 3 and not limited to them. It should be noted that similarly to the client terminal 3, the client terminal 8 also receives the holding end notice message and executes the process when the holding is ended. In this way, the holding states of the client terminal 3 and the client terminal 8 are ended. Hereinafter, the client terminal 3 and the client terminal 8 resume the message transmission/reception.

(Cooperation Process when Call is Ended)

Figure 19:
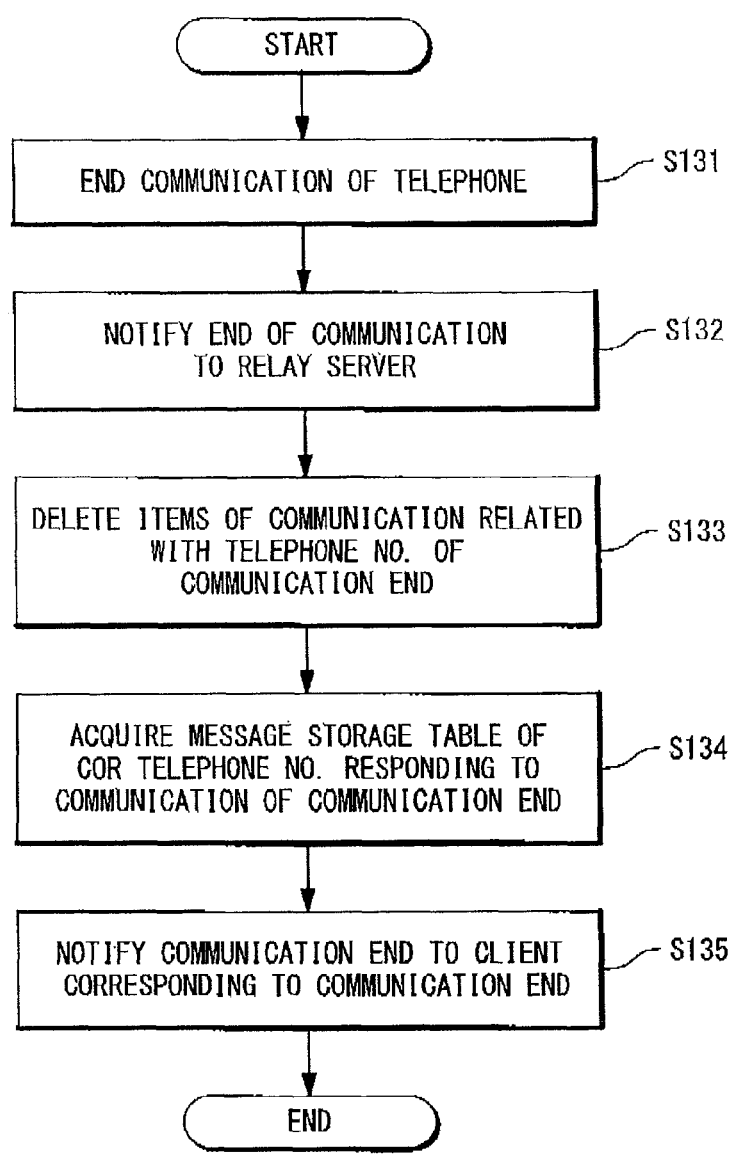
FIG. 19 is a flowchart showing an operation of the message relay system.

An operation when the telephone 1 ends the call will be described below with reference to FIG. 19. At first, the user A performs an operation predetermined to end the call on the telephone 1 on the speech communication call. The telephone 1 notifies a call end to the line switching server 5. The line switching section 51 in the line switching server 5 receives a notice of the call end and then releases the speech communication call between the telephone 1 and the telephone 7 (Step S131).

Then, the call state notifying section 52 detects the call end. The call state notifying section 52 transmits a call end notice message to the call state receiving section 61 in the message relay server 6 to indicate that the call is ended (Step S132). One example of the transmitted call end notice message at this time is shown below:

"BYE FROM=1001"

The above message indicates that the call of the telephone number "1001" is ended.

The call state receiving section 61 receives the call end message. The call state receiving section 61 outputs the call end notice message to the call state control section 62. The call state control section 62 acquires the telephone number of the telephone 1 (hereinafter, to be referred to as the transmission source telephone number) from the call end notice message. The call state control section 62 removes the data for the transmission source telephone number from the call state storage section 63 (Step S133).

The call state control section 62 notifies that call is ended, to the message relay section 68. The call state control section 62 notifies the call end together with the transmission source telephone number and the transmission destination telephone number to the message relay section 68. The message relay section 68 removes the message storage tables for the transmission source telephone number and the transmission destination telephone number from the message storage section 65 (Step S134). Also, the call state control section 62 transmits the call end notice message through the server-side transceiver section 64 to the client terminal 3 and the client terminal 8 in cooperation with the transmission source telephone number and the transmission destination telephone number (Step S135). One example of the call end notice message is shown below:

"STATUS=bye"

The call cooperation section 33 in the client terminal 3 receives the call end notice message through the client-side transceiver section 31. The call cooperation section 33 notifies the call end notice message to the application program 34. The application program 34 receives the call end notice message and executes the process when the call is ended. As the process when the call is ended, a process for notifying the call end to the user and a process for ending the client terminal 3 are executed. However, the process when the call is ended is based on the implementation of the client terminal 3 and not limited to them. It should be noted that similarly to the client terminal 3, the client terminal 8 also receives the call end notice message and executes the process when the call is ended.

The embodiments of the present invention have been described above. As described above, according to the present invention, by using the client terminal in cooperation with the telephone on the speech communication, the user can transmit and receive a message to and from a counter call end. At that time, by using an identifier number of the telephone in cooperation with the client terminal that executes the operation, the user can transmit the message to the client terminal in cooperation with the telephone of the speech communication destination. In short, according to the present invention, between the client terminals in cooperation with the telephones to which the respective users make the communications, each of them can transmit and receive the message by using only the identifier for the telephone of the self-station. Also, the message relay server 6 determines the transfer destination of the message in response to a change in the call state. The user is not required to set the transmission destination in accordance with the call state data. For example, even if the call state is changed to the call, the transfer, the holding or the holding relief, when the user only uses the identification number of the telephone of the self-station without executing any special change operation, an process for changing the transmission destination of the message and the process for stopping the transmission/reception are automatically executed in cooperation to the change in the call state. Thus, the convenience of the user can be improved. Also, the development of the client program assembled into the client terminal becomes easy.

The message relay server of the present invention contains: a call state control section that acquires a call state data including identification data of telephones in a speech communication state, from a line switching server which carries out a call control for the speech communication; a call state storage section for storing the call state data for each call for the speech communication; a message relay section that receives a message, which includes the identification data of a first telephone of the telephones, from one client terminal among a plurality of client terminals in coordination with the first telephone, and specifies a second telephone, which performs the speech communication with the first telephone, in accordance with the identification data and call state data of the first telephone included in the message; and a message storage section for storing the message and the identification data of the second telephone which are related to each other. The message relay section receives a message inquiry to acquire the message, which includes the identification data of the second telephone, from a second client terminal among the plurality of client terminals in cooperation with the second telephone, and transmits the message, which is stored for the identification data of the second telephone included in the message inquiry, to the second client terminal. For this reason, the message relay server can receive the message, which includes only the identification information of the telephone coordinated with each client terminal, from each client terminal, and transmit the message to the different client terminal coordinated with the telephone serving as the call partner of the speech communication.

Also, the message relay server of the present invention further contains: a cooperation data storage section for storing a cooperation data, for each of the plurality of telephones, and the identification data of each telephone which are related to each other; and the cooperation state control section for receiving the identifier inquiry message, which includes the cooperation data for the first telephone, from the first client terminal, and specifying the identification data of the first telephone in accordance with the cooperation data of the first telephone included in the inquiry message, and then transmitting the identification data of the first telephone to the one client terminal. In this way, the message relay server relates the cooperation data such as the user ID for each telephone to the identification data such as the telephone number of each telephone in advance and stores it. For this reason, even if receiving the cooperation data from each client terminal, the message relay server can respond to the identification data for the cooperation data. Thus, each client terminal can transmit the message by using the cooperation data.

Also, the message relay section in the message relay server of the present invention, when receiving the message, determines the call state of the speech communication in accordance with the call state data, and if the call state for the identification data of the first telephone is stored, specifies the second telephone in accordance with the call state data and identification data of the first telephone included in the message, and relates the message to the identification data of the second telephone and stores it, and discards the message if the call state is not busy. In this way, when receiving the message from each client terminal, the message relay server stores the call state of each telephone in cooperation with each client terminal, and discards the message if the call state is not busy. Thus, only when the telephone in cooperation with the client terminal is making the speech communication, the message can be transferred to the counter end of the speech communication. Therefore, the message relay server can surely transmit, the message to the counter end of the speech communication and can protect the message from being erroneously transmitted to a mistaken end and increase a security.

Also, in the message relay server of the present invention, when receiving the inquiry message, the message relay section does not transmit the message that is stored for the identification data of the second telephone, it the call state of the speech communication performed by the second telephone is held, in accordance with the call state data for, the identification data of the second telephone included in the inquiry message. In this way, when the call state of each telephone making the speech communication is held, the message relay server does not transfer the message even if receiving the message from the client terminal in cooperation with each telephone. Thus, the message relay server can transfer the message for the call situation of the speech communication.

Also, in the message relay server of the present invention, when the transfer of the speech communication is generated, the call state control section acquires the identification data of the telephone before the transfer and the identification data of the telephone after the transfer, from the line switching server, and the call state storage section rewrites the identification data of the telephone before the transfer, which has been stored in the call state data, to the identification data of the telephone after the transfer, and the message relay section relates the message, which is stored for the identification data of the telephone before the transfer, to the identification data of the telephone after the transfer, and copies it. In this way, when the speech communication is transferred, the message relay server relates the message stored for the identification data of the telephone of the transfer source, to the identification data of the telephone of the transfer destination, and re-stores it. Thus, the message relay server can transfer the message for the call situation of the speech communication.

It should be noted that the effects of the message relay server of the above configuration can be attained by the message relay system and the message relay method that contain the message relay server, and even the storing medium that stores the program for attaining the functions of the message relay server, and the object of the present invention as mentioned above can be attained.

As mentioned above, the present invention has been described by referring to the embodiments. However, the present invention is not limited to the above-mentioned embodiments. Various modifications that can be understood by one skilled in the art within the scope of the present invention can be made to the configurations and details of the present invention.

It should be noted that this application claims a priority based on Japanese Patent Application No. 2007-302525, filed on Nov. 22, 2007, and the disclosure thereof is incorporated herein by reference.

The invention claimed is:

1. A message relay server comprising:
   a call state control section configured to acquire a call state data which contains identification data of a plurality of telephones which perform a speech communication;
   a call state storage section configured to store said call state data for every said speech communication;
   a message storage section; and
   a message relay section configured to receive a message from a first client terminal of a plurality of client terminals which is in cooperation with a first telephone of said plurality of telephones, specify a second telephone which performs the speech communication with said first telephone based on said call state data and the identification data of said first telephone in said message, receive a message inquiry from a second client terminal of said plurality of client terminals which is in cooperation with said second telephone, transmits said message to said second client terminal based on the identification data of said second telephone in said message, and store said message and the identification data of said first and second telephones as a message storage table in said message storage section.

2. The message relay server according to claim 1, wherein said message relay server further comprises:
   a cooperation data storage section configured to store a cooperation data for each of said plurality of telephones and the identification data of said each telephone; and
   a cooperation state control section configured to specify the identification data of said first telephone based on the cooperation data for said first telephone in response to an identification inquiry from said first client terminal, and transmit the specified identification data of said first telephone to said first client terminal.

3. The message relay server according to claim 1, wherein said message relay section determines a call state in said speech communication based on said call state data in response to a reception of said message, specifies said second telephone based on said call state data and the identification data of said first telephone contained in said message when said call state data for the identification data of said first telephone indicates a busy state, stores said message and the identification data of said second telephone as the message storage table, and discards said message when said call state data does not indicate a busy state.

4. The message relay server according to claim 3, wherein said message relay section stops the transmission of said message for the identifier of said second telephone upon reception of said identification inquiry, when said call state data for the identification data of said second telephone which is contained in an identification inquiry indicates that the call state of said speech communication by said second telephone indicates a held state.

5. The message relay server according to claim 4, wherein said call state control section acquires the identification data of the telephone before transfer and the identification data of the telephone after the transfer from said line switching server when the transfer of said speech communication call is requested,
   wherein said call state storage section rewrites the identifier data of the telephone before the transfer which has been stored in said call state data into the identifier of the telephone after said transfer, and
   wherein said message relay section copies said message having stored for the identifier of the telephone before said transfer to correspond to the identifier of the telephone after said transfer.

6. A message relay system comprising:
   a plurality of client terminals;
   a line switching server configured to control a speech communication among a plurality of telephone; and
   a message relay server,
   wherein said message relay server comprises:
   a call state control section configured to acquire a call state data which contains identification data of said plurality of telephones which perform a speech communication, from said line switching server;
   a call state storage section configured to store said call state data for every said speech communication;
   a message storage section; and
   a message relay section configured to receive a message from a first client terminal of said plurality of client terminals which is in cooperation with a first telephone of said plurality of telephones, specify a second telephone which performs the speech communication with said first telephone based on said call state data and the identification data of said first telephone in said message, receive a message inquiry from a second client terminal of said plurality of client terminals which is in cooperation with said second telephone, transmits said message to said second client terminal based on the identification data of said second telephone in said message, and store said message and the identification data of said first and second telephones as a message storage table in said message storage section.

7. The message relay system according to claim 6, wherein said message relay server further comprises:
a cooperation data storage section configured to store a cooperation data for each of said plurality of telephones and the identification data of said each telephone; and
a cooperation state control section configured to specify the identification data of said first telephone based on the cooperation data for said first telephone in response to an identification inquiry from said first client terminal, and transmit the specified identification data of said first telephone to said first client terminal.

8. The message relay system according to claim 6, wherein said message relay section determines a call state in said speech communication based on said call state data in response to a reception of said message, specifies said second telephone based on said call state data and the identification data of said first telephone contained in said message when said call state data for the identification data of said first telephone indicates a busy state, stores said message and the identification data of said second telephone as the message storage table, and discards said message when said call state data does not indicate a busy state.

9. The message relay system according to claim 8, wherein said message relay section stops the transmission of said message for the identifier of said second telephone upon reception of said identification inquiry, when said call state data for the identification data of said second telephone which is contained in an identification inquiry indicates that the call state of said speech communication by said second telephone indicates a held state.

10. The message relay system according to claim 9, wherein said call state control section acquires the identification data of the telephone before transfer and the identification data of the telephone after the transfer from said line switching server when the transfer of said speech communication call is requested,
wherein said call state storage section rewrites the identifier data of the telephone before the transfer which has been stored in said call state data into the identifier of the telephone after said transfer, and
wherein said message relay section copies said message having stored for the identifier of the telephone before said transfer to correspond to the identifier of the telephone after said transfer.

11. A message relay method comprising:
acquiring a call state data which contains identification data of a plurality of telephones which perform a speech communication, from a line switching server; storing said call state data for every said speech communication;
receiving a message from a first client terminal of said plurality of client terminals which is in cooperation with a first telephone of said plurality of telephones;
specifying a second telephone which performs the speech communication with said first telephone based on said call state data and the identification data of said first telephone in said message;
receiving a message inquiry from a second client terminal of said plurality of client terminals which is in cooperation with said second telephone;
transmits said message to said second client terminal based on the identification data of said second telephone in said message; and
storing said message and the identification data of said first and second telephones as a message storage table in a message storage section.

12. The message relay method according to claim 11, further comprising:
storing a cooperation data for each of said plurality of telephones and the identification data of said each telephone;
specifying the identification data of said first telephone based on the cooperation data for said first telephone in response to an identification inquiry from said first client terminal; and
transmitting the specified identification data of said first telephone to said first client terminal.

13. The message relay method according to claim 11, further comprising: determining a call state in said speech communication based on said call state data in response to a reception of said message;
specifying said second telephone based on said call state data and the identification data of said first telephone contained in said message when said call state data for the identification data of said first telephone indicates a busy state;
storing said message and the identification data of said second telephone as the message storage table; and
discarding said message when said call state data does not indicate a busy state.

14. The message relay method according to claim 13, further comprising:
stopping the transmission of said message for the identifier of said second telephone upon reception of said identification inquiry, when said call state data for the identification data of said second telephone which is contained in an identification inquiry indicates that the call state of said speech communication by said second telephone indicates a held state.

15. The message relay method according to claim 14, further comprising:
acquiring the identification data of the telephone before transfer and the identification data of the telephone after the transfer from said line switching server when the transfer of said speech communication call is requested;
rewriting the identifier data of the telephone before the transfer which has been stored in said call state data into the identifier of the telephone after said transfer; and
copying said message having stored for the identifier of the telephone before said transfer to correspond to the identifier of the telephone after said transfer.

16. A non-transitory computer-readable recording medium in which a computer-executable program code is recorded to attain a message relay method, which comprises:
acquiring a call state data which contains identification data of a plurality of telephones which perform a speech communication, from a line switching server; storing said call state data for every said speech communication;
receiving a message from a first client terminal of said plurality of client terminals which is in cooperation with a first telephone of said plurality of telephones;
specifying a second telephone which performs the speech communication with said first telephone based on said call state data and the identification data of said first telephone in said message;
receiving a message inquiry from a second client terminal of said plurality of client terminals which is in cooperation with said second telephone;

transmits said message to said second client terminal based on the identification data of said second telephone in said message; and storing said message and the identification data of said first and second telephones as a message storage table in a message storage section.

17. The non-transitory computer-readable recording medium according to claim 16, wherein said message relay method further comprises:

storing a cooperation data for each of said plurality of telephones and the identification data of said each telephone;

specifying the identification data of said first telephone based on the cooperation data for said first telephone in response to an identification inquiry from said first client terminal; and transmitting the specified identification data of said first telephone to said first client terminal.

18. The non-transitory computer-readable recording medium according to claim 16, wherein said message relay method further comprises:

determining a call state in said speech communication based on said call state data in response to a reception of said message;

specifying said second telephone based on said call state data and the identification data of said first telephone contained in said message when said call state data for the identification data of said first telephone indicates a busy state;

storing said message and the identification data of said second telephone as the message storage table; and discarding said message when said call state data does not indicate a busy state.

19. The non-transitory computer-readable recording medium according to claim 18, wherein said message relay method further comprises:

stopping the transmission of said message for the identifier of said second telephone upon reception of said identification inquiry, when said call state data for the identification data of said second telephone which is contained in an identification inquiry indicates that the call state of said speech communication by said second telephone indicates a held state.

20. The non-transitory computer-readable recording medium according to claim 19, wherein said message relay method further comprises:

acquiring the identification data of the telephone before transfer and the identification data of the telephone after the transfer from said line switching server when the transfer of said speech communication call is requested;

rewriting the identifier data of the telephone before the transfer which has been stored in said call state data into the identifier of the telephone after said transfer; and copying said message having stored for the identifier of the telephone before said transfer to correspond to the identifier of the telephone after said transfer.

\* \* \* \* \*

UNITED STATES PATENT AND TRADEMARK OFFICE
CERTIFICATE OF CORRECTION

| | | |
|---|---|---|
| PATENT NO. | : 8,537,988 B2 | Page 1 of 1 |
| APPLICATION NO. | : 12/744304 | |
| DATED | : September 17, 2013 | |
| INVENTOR(S) | : Takahiro Shiroshima | |

It is certified that error appears in the above-identified patent and that said Letters Patent is hereby corrected as shown below:

In the Specification

Column 1, Line 36: Delete "System" and insert -- system --

Column 1, Line 59: Delete "contains;" and insert -- contains: --

Column 3, Line 15: Delete "contains;" and insert -- contains: --

Column 8, Line 15: Delete "(Step 63)." and insert -- (Step S3). --

Column 10, Line 58: Delete "10.01" and insert -- "1001" --

Column 15, Line 12: Delete "FIG. 60" and insert -- FIG. 6C --

Column 18, Line 11: After "telephone" insert -- 1 --

Column 19, Line 18: After "section" insert -- 62 --

Signed and Sealed this
Eleventh Day of November, 2014

Michelle K. Lee
*Deputy Director of the United States Patent and Trademark Office*